(12) United States Patent
Mossberg et al.

(10) Patent No.: US 7,330,614 B1
(45) Date of Patent: Feb. 12, 2008

(54) INTEGRATED OPTICAL SPECTROMETER INCORPORATING SETS OF DIFFRACTIVE ELEMENTS

(75) Inventors: Thomas W. Mossberg, Eugene, OR (US); Dmitri Iazikov, Springfield, OR (US); Christoph M. Greiner, Eugene, OR (US)

(73) Assignee: LightSmyth Technologies Inc., Eugene, OR (US)

( * ) Notice: Subject to any disclaimer, the term of this patent is extended or adjusted under 35 U.S.C. 154(b) by 0 days.

(21) Appl. No.: 11/298,290

(22) Filed: Dec. 9, 2005

Related U.S. Application Data

(60) Provisional application No. 60/635,206, filed on Dec. 10, 2004.

(51) Int. Cl.
*G02B 6/12* (2006.01)

(52) U.S. Cl. .................... 385/14; 385/10; 385/15; 385/129

(58) Field of Classification Search .............. 385/14
See application file for complete search history.

(56) References Cited

U.S. PATENT DOCUMENTS

| | | | |
|---|---|---|---|
| 3,995,937 A | 12/1976 | Baues et al. |
| 4,006,967 A | 2/1977 | Kenan et al. |
| 4,140,362 A | 2/1979 | Tien |
| 4,387,955 A | 6/1983 | Ludman et al. |
| 4,440,468 A | 4/1984 | Auracher et al. |
| 4,660,934 A | 4/1987 | Akiba et al. |
| 4,740,951 A | 4/1988 | Lizet et al. |
| 4,743,083 A | 5/1988 | Schimpe |
| 4,746,186 A | 5/1988 | Nicia |
| 4,773,063 A | 9/1988 | Hunsperger et al. |
| 4,786,133 A | 11/1988 | Gidon et al. |
| 4,803,696 A | 2/1989 | Pepper et al. |
| 4,824,193 A | 4/1989 | Maeda et al. |
| 4,834,474 A | 5/1989 | George et al. |
| 4,846,552 A | 7/1989 | Veldkamp et al. |

(Continued)

FOREIGN PATENT DOCUMENTS

EP 0 310 438 A1 4/1989

(Continued)

OTHER PUBLICATIONS

Capron et al, J. Lightwave Tech., vol. 11 No. 12 pp. 2009-2014 (Dec. 1993), "Design and Performance on a Multiple Element Slab Waveguide Spectrograph for Multimode Fiber-Optic ISDM System".

(Continued)

*Primary Examiner*—Jennifer Doan
(74) *Attorney, Agent, or Firm*—David S. Alavi

(57) ABSTRACT

An exemplary optical apparatus comprises: an optical element having multiple sets of diffractive elements; and a photodetector. The diffractive elements of each set are collectively arranged so as to comprise corresponding spectral and spatial transformation information for each set. At least two of the sets differ with respect to their corresponding spectral and spatial transformation information. The diffractive elements of each of the sets are collectively arranged so as to transform a portion of an input optical signal into a corresponding output optical signal according to the corresponding spectral and spatial transformation information. At least one photodetector is positioned for receiving at least one of the corresponding output optical signals.

67 Claims, 13 Drawing Sheets

U.S. PATENT DOCUMENTS

| | | | |
|---|---|---|---|
| 4,852,960 A | 8/1989 | Alferness et al. |
| 4,923,271 A | 5/1990 | Henry et al. |
| 4,938,553 A | 7/1990 | Maerz et al. |
| 5,040,864 A | 8/1991 | Hong |
| 5,093,874 A | 3/1992 | Hawkins et al. |
| 5,107,359 A | 4/1992 | Ohuchida |
| 5,165,104 A | 11/1992 | Weverka |
| 5,195,161 A | 3/1993 | Adar et al. |
| 5,357,591 A | 10/1994 | Jiang et al. |
| 5,450,511 A | 9/1995 | Dragone |
| 5,453,871 A | 9/1995 | Kolner et al. |
| 5,668,900 A | 9/1997 | Little et al. |
| 5,768,450 A | 6/1998 | Bhagavatula |
| 5,812,318 A | 9/1998 | Babbitt et al. |
| 5,830,622 A | 11/1998 | Canning et al. |
| 5,907,647 A | 5/1999 | Eggleton et al. |
| 5,995,691 A | 11/1999 | Arai et al. |
| 6,011,884 A | 1/2000 | Dueck et al. |
| 6,011,885 A | 1/2000 | Dempewolf et al. |
| 6,137,933 A | 10/2000 | Hunter et al. |
| 6,144,480 A | 11/2000 | Li et al. |
| 6,169,613 B1 | 1/2001 | Amitai et al. |
| 6,169,614 B1 | 1/2001 | Whitcomb et al. |
| 6,266,463 B1 | 7/2001 | Laming et al. |
| 6,285,813 B1 | 9/2001 | Schultz et al. |
| 6,323,970 B1 | 11/2001 | Popovich |
| 6,408,118 B1 | 6/2002 | Ahuja et al. |
| 6,473,232 B2 | 10/2002 | Ogawa |
| 6,553,162 B1 | 4/2003 | Okayama |
| 6,603,901 B1 | 8/2003 | Hale et al. |
| 6,678,429 B2 | 1/2004 | Mossberg et al. |
| 6,702,897 B2 | 3/2004 | Cullen et al. |
| 6,718,093 B2 | 4/2004 | Zhou |
| 6,768,834 B1 | 7/2004 | Gruhlke |
| 6,823,115 B2 | 11/2004 | Greiner et al. |
| 6,829,417 B2 | 12/2004 | Greiner et al. |
| 6,850,670 B2 | 2/2005 | Parhami et al. |
| 6,859,318 B1 | 2/2005 | Mossberg |
| 6,876,791 B2 | 4/2005 | Murashima et al. |
| 6,879,441 B1 | 4/2005 | Mossberg |
| 6,928,223 B2 | 8/2005 | Walpole et al. |
| 6,961,491 B2 | 11/2005 | Greiner et al. |
| 6,965,464 B2 | 11/2005 | Mossberg |
| 6,965,716 B2 | 11/2005 | Greiner et al. |
| 6,985,656 B2 | 1/2006 | Iazikov et al. |
| 6,987,911 B2 | 1/2006 | Mossberg et al. |
| 6,990,276 B2 | 1/2006 | Brice et al. |
| 6,993,223 B2 | 1/2006 | Greiner et al. |
| 7,003,187 B2 | 2/2006 | Frick et al. |
| 7,009,743 B2 * | 3/2006 | Mossberg .................... 359/34 |
| 7,016,569 B2 | 3/2006 | Mule et al. |
| 7,049,704 B2 | 5/2006 | Chakravorty et al. |
| 7,054,517 B2 | 5/2006 | Mossberg et al. |
| 7,062,128 B2 * | 6/2006 | Mossberg .................... 385/37 |
| 7,116,453 B2 | 10/2006 | Mossberg |
| 7,116,852 B2 | 10/2006 | Tuda |
| 7,120,334 B1 | 10/2006 | Greiner et al. |
| 7,123,794 B2 | 10/2006 | Greiner et al. |
| 7,181,103 B1 | 2/2007 | Greiner et al |
| 7,190,856 B1 | 3/2007 | Iazikov et al. |
| 7,190,858 B1 | 3/2007 | Greiner et al. |
| 7,190,859 B2 | 3/2007 | Greiner et al. |
| 7,194,164 B2 | 3/2007 | Iazikov et al. |
| 7,203,401 B2 | 4/2007 | Mossberg et al. |
| 2002/0071646 A1 | 6/2002 | Eggleton et al. |
| 2003/0011833 A1 | 1/2003 | Yankov et al. |
| 2003/0039444 A1 | 2/2003 | Mossberg et al. |
| 2003/0068113 A1 | 4/2003 | Janz et al. |
| 2003/0117677 A1 | 6/2003 | Mossberg |
| 2004/0076374 A1 | 4/2004 | Greiner et al. |
| 2004/0131360 A1 | 7/2004 | Iazikov et al. |
| 2004/0170356 A1 | 9/2004 | Iazikov et al. |
| 2004/0179779 A1 | 9/2004 | Greiner et al. |
| 2004/0208466 A1 | 10/2004 | Mossberg et al. |
| 2004/0258356 A1 | 12/2004 | Brice et al. |
| 2005/0018951 A1 | 1/2005 | Mossberg et al. |
| 2005/0063430 A1 | 3/2005 | Doucet et al. |
| 2005/0078912 A1 | 4/2005 | Iazikov et al. |
| 2005/0135744 A1 | 6/2005 | Greiner et al. |
| 2005/0135745 A1 | 6/2005 | Greiiner et al. |
| 2005/0135747 A1 | 6/2005 | Greiner et al. |
| 2005/0152011 A1 | 7/2005 | Mossberg |
| 2005/0163425 A1 | 7/2005 | Greiner et al. |
| 2005/0196114 A1 | 9/2005 | Xu et al. |
| 2006/0023280 A1 | 2/2006 | Mossberg |
| 2006/0139712 A1 | 6/2006 | Mossberg |
| 2006/0177178 A1 | 8/2006 | Greiner et al. |
| 2006/0193553 A1 | 8/2006 | Mossberg |
| 2006/0210214 A1 | 9/2006 | Uhlhorn et al. |
| 2006/0233493 A1 | 10/2006 | Mossberg |
| 2007/0019910 A1 | 1/2007 | Greiner et al. |
| 2007/0034730 A1 | 2/2007 | Mossberg et al. |
| 2007/0053635 A1 | 3/2007 | Iazikov et al. |

FOREIGN PATENT DOCUMENTS

| | | |
|---|---|---|
| GB | 2 168 215 A | 6/1986 |
| WO | WO-99/355323 A1 | 7/1999 |
| WO | WO-99/56159 A1 | 11/1999 |
| WO | WO 02-075411 | 9/2002 |

OTHER PUBLICATIONS

Deri et al, IEEE Photonics Tech. Lett., vol. 6 No. 2 pp. 242-244 (Feb. 1994), "Quantitative Analysis of Integrated Optic Waveguide Spectrometers".

Grunnet-Jepsen et al. Electon. Lett., vol. 35 No. 13 pp. 1096-1097 (Jun. 1999), "Fiber Bragg grating based spectral encoder/decoder for lightwave CDMA."

Paddon et al, Opt. Lett., vol. 23 No. 19 pp. 1529-1531 (1998), "Simple approach to coupling in textured planar waveguides."

Madsen et al, IEEE J. Sel. Top. Quant. Elec., vol. 4 No. 6 pp. 925-929 (Nov./Dec. 1998), "Planar Waveguide Optical Spectrum Analyzer Using a UV-Induced Grating."

Gini et al, J. Lightwave Tech., vol. 16 No. 4 pp. 625-630 (Apr. 1998), "Polarization Independent InP WDM Multiplexer/Demultiplexer Module".

Day et al, J. Lightwave Tech., vol. 14 No. 8 pp. 1815-1824 (Aug. 1996), "Filter-Response Line Shapes of Resonant Waveguide Gratings."

McGeer, IEEE Photonics Tech. Lett., vol. 7 No. 3 pp. 324-326 (Mar. 1995), "Diffraction from Concave Gratings in Planar Waveguides".

Takenouchi et al, Optics Express, vol. 6 No. 6 pp. 124-135 (Mar. 2000), "Analysis of optical-signal processing using an arrayed waveguide grating".

Grunnett-Jepsen et al, Photonics Tech. Lett., vol. 11 No. 10 p. 1283 (Oct. 1999), "Demonstration on All-Fiber Sparse Lighwave CDMA Based on Temporal Phased Enading."

Babbitt et al, Opt. Commun., vol. 148 pp. 23-26 (1998), "Optical waveform processing and routing with structured surface gratings".

Brigham et al, Analysis of scattering from large planar gratings of compliant ctlindrical shells, J. Acoust. Soc. Am., vol. 61 No. 1 pp. 48-59 (Jan. 1977).

Kurokawa et al, Electron. Lett., vol. 33 No. 22 pp. 1890-1891 (Oct. 1997), "Time-space-conversion optical signal processing using arrayed-waveguide grating."

Sudbo et al, J. Lightwave Tech., vol. 8 No. 6 pp. 998-1006 (Jun. 1990), "Reflectivity of Integrated Optical Filters Based on Elliptic Bragg Reflectors".

Henry, J. Lightwave Tech., vol. 8 No. 5 pp. 748-755 (May 1990), "Four-channel Wavelength Division Multiplexers and Bandpass Filters Based on Elliptical Bragg Reflectors".

Koontz et al, Appl. Phys. Lett., vol. 71 No. 10 pp. 1400-1402 (Sep. 1997), "Reservation of Rectangular-patterned InP gratings overgrown by gas source molecular beam epitaxy".

Song et al, Appl. Opt., vol. 34 No. 26 pp. 5913-5919 (Sep. 1995), "Focusing grating coupler arrays for uniform and efficient signal distribution in a backboard optical interconnector".

Brazas et al, Appl. Opt., vol. 34 No. 19 pp. 3786-3792 (Jul. 1995), "Analysis of input-grating couplers having finite lengths".

Bates et al, Appl. Opt., vol. 32 No. 12 pp. 2112-2116 (Apr. 1993), "Gaussian beams from variable groove depth grating couplers in planar waveguides".

Wang et al, Appl Opt., vol. 32 No 14 pp. 2606-2613 (May 1993), "Theory and applications of guided-mode resonance filters."

Magnusson et al, Appl. Phys. Lett., vol. 61 No. 9 pp. 1022-1024 (Aug. 1992).

Ojha et al, Demonstration of low loss integrated InGaAsP/InP demultiplexer device with low polarisation sensitivity, Electron. Lett., vol. 29 No. 9 p. 805 (Apr. 1993).

Li, Opt. Commum., vol. 114 pp. 406-412 (1995).

Soole et al, Electron. Lett., vol. 31 No. 15 pp. 1276-1277 (Jul. 1995).

Rantala et al, Electron. Lett. vol. 34 No. 5 pp. 455-456 (Mar. 1998).

Cowin et al Electron. Lett., vol. 35 No. 13 pp. 1074-1076 (Jun. 1999).

Canning et al, Opt. Commun., vol. 171 pp. 213-217 (1999).

Tien et al, Use of concentric-arc grating as a thin-film spectrograph for guided waves, Am. Inst. of Physics (1980) pp. 524-525.

Kaneko et al, IEEE J. Sci. Top. Quant. Elec., vol. 5 No. 5 pp. 1227-1236 (Sep./Oct. 1999).

Sun et al, IEEE Photonics Tech. Lett., vol. 10 No. 1 pp. 90-92 (Jan. 1998).

McGreer, IEEE Photonics Tech. Lett., vol. 8 No. 4 pp. 551-553 (Apr. 1996).

Avrutsky et al, IEEE Photonics Tech. Lett., vol. 10 No. 6 pp. 839-841 (Jun. 1998).

Alavie et al, IEEE Photonics Tech. Lett., vol. 5 No. 9 pp. 1112-1114 (Sep. 1993).

Fu et al, Opt. Lett., vol. 22 No. 21 pp. 1627-1629 (1997).

Wang et al, IEEE Photonics Tech. Lett . vol. 3 No. 1 pp. 36-38 (Jan. 1991).

Wang et al Opt. Lett., vol. 15 No. 7 pp. 363-365 (Apr. 1990).

Wu et al, J. Lightwave Tech., vol. 10 No. 11 pp. 1575-1589 (Nov. 1992).

Eldada et al. IEEE Photonics Tech. Lett., vol. 12 No. 7 pp. 819-821 (Jul. 2000).

Chen et al, J. Lightwave Tech., vol. 10 No. 7 pp. 888-897 (Jul. 1992).

Minier et al, Diffraction characateristics of superimposed holographic gratings in planar optical waveguides, IEEE Photonics Tech. Lett., vol. 4 No. 10 p. 1115 (Oct. 1992).

Miya, IEEE J. Sel. Top. Quant. Elec., vol. 6 No. 1 pp. 38-45 (Jan./Feb. 2000).

Backlund et al, IEEE Photonics Tech. Lett., vol. 12 No. 3 pp. 314-316 (Mar. 2000).

Wiesman et al, IEEE Photonics Tech. Lett., vol. 12 No. 6 pp. 639-641 (Jun. 2000).

Ura et al, Integrated optical wavelength demultiplexer using a coplanar grating lens, Appl. Opt., vol. 29 No. 9 pp. 1369-1373 (Mar. 1990).

Chen et al. Ten channel single-mode wavelength division demultiplexer in the near IR, Integrated Optical Circuits, vol. 1583 pp. 134-142 (Intl. Soc. Opt. Eng., Boston, MA, USA, Sep. 1991).

Babbitt et al, Opt. Lett., vol. 20 No. 8 pp. 910-912 (Apr. 1995), "Spatial routing of optical beams through time-domain spatial-spectral filtering."

Mossberg, Opt. Lett., vol. 26 No. 7 pp. 414-416 (Apr. 2001).

Tang et al, A novel wavelength-division-demultiplexer with optical in-plane to surface-normal conversion, IEEE Photonics Tech. Lett., vol. 7 No. 8 p. 908 (Aug. 1995).

Brady et al, Applied Optics, vol. 30 No. 17 p. 2324 (Jun. 1991).

Preston, "Digital holographic logic", Pattern Recognition, vol. 5, p. 37 (1973).

Hirayama et al. Applied Physics Letters, vol. 69 No. 6 p. 791 (Aug. 5, 1996).

Lohmann et al, Applied Optics, vol. 34 No. 17 p. 3172 (Jun. 10, 1995).

Bedford et al, IEEE Photonics Technology Letters, vol. 12 No. 8 p. 948 (Aug. 2000).

Kristjansson etal, IEEE Photonics Technology Letters, vol. 12 No. 10 p. 1319 (Oct. 2000).

Modh et al, IEEE J. Quantum Electronics, vol. 37 No. 6 p. 752 (Jun. 2001).

Eriksson et al, IEEE J. Quantum Electronics, vol. 34 No. 5 p. 858 (May 1998).

Kazarinov et al, IEEE J. Quantum Electronics, vol. QE-23 No. 9 p. 1419 (Sep. 1987).

Eriksson et al, IEEE Photonics Technology Letters, vol. 9 No. 12 p. 1570 (Dec. 1997).

* cited by examiner

INTEGRATED OPTICAL SPECTROMETER INCORPORATING SETS OF DIFFRACTIVE ELEMENTS

BENEFIT CLAIMS TO RELATED APPLICATIONS

This application claims benefit of prior-filed co-pending provisional App. No. 60/635,206 filed Dec. 10, 2004, said provisional application being hereby incorporated by reference as if fully set forth herein.

BACKGROUND

The field of the present invention relates to integrated spectrometers. In particular, disclosed herein are various embodiments of an integrated spectrometer incorporating one or more sets of diffractive elements.

Various embodiments, implementations, and adaptations of planar optical waveguides with diffractive element sets are disclosed in:

application Ser. No. 11/280,876 filed Nov. 15, 2005 in the names of Christoph M. Greiner, Dmitri Iazikov, and Thomas W. Mossberg;

application Ser. No. 11/239,540 filed Sep. 28, 2005 in the name of Thomas W. Mossberg (now U.S. Pat. No. 7,009,743 issued Mar. 7, 2006);

application Ser. No. 11/213,345 filed Aug. 25, 2005 in the names of Christoph M. Greiner, Dmitri Iazikov, and Thomas W. Mossberg (now U.S. Pat. No. 7,120,334 issued Oct. 10, 2006);

application Ser. No. 11/210,439 filed Aug. 23, 2005 in the names of Dmitri Iazikov, Christoph M. Greiner, and Thomas W. Mossberg;

application Ser. No. 11/155,327 filed Jun. 16, 2005 in the names of Christoph M. Greiner, Thomas W. Mossberg, and Dmitri Iazikov (now U.S. Pat. No. 7,190,856 issued Mar. 13, 2007);

application Ser. No. 11/076,251 filed Mar. 8, 2005 in the name of Thomas W. Mossberg (now U.S. Pat. No. 7,062,128 issued Jun. 13, 2006);

application Ser. No. 11/062,109 filed Feb. 17, 2005 in the names of Christoph M. Greiner, Thomas W. Mossberg, and Dmitri Iazikov (now U.S. Pat. No. 7,181,103 issued Feb. 20, 2007);

application Ser. No. 11/055,559 filed Feb. 9, 2005 in the names of Christoph M. Greiner, Thomas W. Mossberg, and Dmitri Iazikov (now U.S. Pat. No. 7,123,794 issued Oct. 17, 2006);

application Ser. No. 11/021,549 filed Dec. 23, 2004 in the names of Dmitri Iazikov, Christoph M. Greiner, and Thomas W. Mossberg;

application Ser. No. 10/998,185 filed Nov. 26, 2004 in the names of Dmitri Iazikov, Christoph M. Greiner, and Thomas W. Mossberg (now U.S. Pat. No. 6,993,223 issued Jan. 31, 2006);

application Ser. No. 10/989,244 filed Nov. 15, 2004 in the names of Christoph M. Greiner, Thomas W. Mossberg, and Dmitri Iazikov (now U.S. Pat. No. 6,961,491 issued Nov. 1, 2005);

application Ser. No. 10/989,236 filed Nov. 15, 2004 in the names of Christoph M. Greiner, Dmitri Iazikov, and Thomas W. Mossberg (now U.S. Pat. No. 6,965,716 issued Nov. 15, 2005);

application Ser. No. 10/923,455 filed Aug. 21, 2004 in the names of Thomas W. Mossberg, Dmitri Iazikov, and Christoph M. Greiner (now U.S. Pat. No. 7,054,517 issued May 30, 2006);

application Ser. No. 10/898,527 filed Jul. 22, 2004 in the named of Dmitri Iazikov, Christoph M. Greiner, and Thomas W. Mossberg (now U.S. Pat. No. 7,194,164 issued Mar. 20, 2007);

application Ser. No. 10/857,987 filed May 29, 2004 in the names of Lawrence D. Brice, Christoph M. Greiner, Thomas W. Mossberg, and Dmitri Iazikov (now U.S. Pat. No. 6,990,276 issued Jan. 24, 2006);

application Ser. No. 10/842,790 filed May 11, 2004 in the names of Thomas W. Mossberg, Christoph M. Greiner, and Dmitri Iazikov (now U.S. Pat. No. 6,987,911 issued Jan. 17, 2006);

application Ser. No. 10/798,089 filed Mar. 10, 2004 in the names of Christoph M. Greiner, Thomas W. Mossberg, and Dmitri Iazikov (now U.S. Pat. No. 6,823,115 issued Nov. 23, 2004);

application Ser. No. 10/794,634 filed Mar. 5, 2004 in the names of Dmitri Iazikov, Thomas W. Mossberg, and Christoph M. Greiner (now U.S. Pat. No. 6,985,656 issued Jan. 10, 2006);

application Ser. No. 10/740,194 filed Dec. 17, 2003 in the names of Dmitri Iazikov, Thomas W. Mossberg, and Christoph M. Greiner;

application Ser. No. 10/653,876 filed Sep. 2, 2003 in the names of Christoph M. Greiner, Dmitri Iazikov, and Thomas W. Mossberg (now U.S. Pat. No. 6,829,417 issued Dec. 7, 2004);

application Ser. No. 10/602,327 filed Jun. 23, 2003 in the name of Thomas W. Mossberg (now U.S. Pat. No. 6,859,318 issued Feb. 22, 2005);

application Ser. No. 10/229,444 filed Aug. 27, 2002 in the names of Thomas W. Mossberg and Christoph M. Greiner (now U.S. Pat. No. 6,678,429 issued Jan. 13, 2004);

application Ser. No. 09/843,597 filed Apr. 26, 2001 in the name of Thomas W. Mossberg (now U.S. Pat. No. 6,965,464 issued Nov. 15, 2005);

application Ser. No. 09/811,081 filed Mar. 16, 2001 in the name of Thomas W. Mossberg (now U.S. Pat. No. 6,879,441 issued Apr. 12, 2005).

SUMMARY

An exemplary optical apparatus comprises: an optical element having multiple sets of diffractive elements; and at least one photodetector. The diffractive elements of each of the multiple diffractive element sets are collectively arranged so as to comprise corresponding spectral and spatial transformation information for each set. At least two of the diffractive element sets differ with respect to their corresponding spectral transformation information and with respect to their corresponding spatial transformation information. The diffractive elements of each of the multiple diffractive element sets are collectively arranged so as to transform a portion of an input optical signal into a corresponding output optical signal according to the corresponding spectral and spatial transformation information, the input optical signal propagating within the optical element from an input optical port, the corresponding output optical signal propagating within the optical element to a corresponding output optical port. At least one photodetector is positioned for receiving at least one of the corresponding output optical signals from the corresponding output optical port.

Another exemplary optical apparatus comprises: an optical element having a set of diffractive elements; and at least one photodetector. The diffractive elements of the set are collectively arranged so as to comprise spectral and spatial transformation information. The diffractive elements of the set are collectively arranged so as to transform a portion of an input optical signal into an output optical signal according to the spectral and spatial transformation information, the input optical signal propagating within the optical element from an input optical port, the output optical signal propagating within the optical element to an optical output region of the optical element. The spectral and spatial transformation information varies among the diffractive elements of the set so that an optical spectrum of the output optical signal varies with spatial position at the optical output region of the optical element.

Objects and advantages pertaining to integrated spectrometers incorporating diffractive element sets may become apparent upon referring to the exemplary embodiments illustrated in the drawings and disclosed in the following written description and/or claims.

Figure 1A:
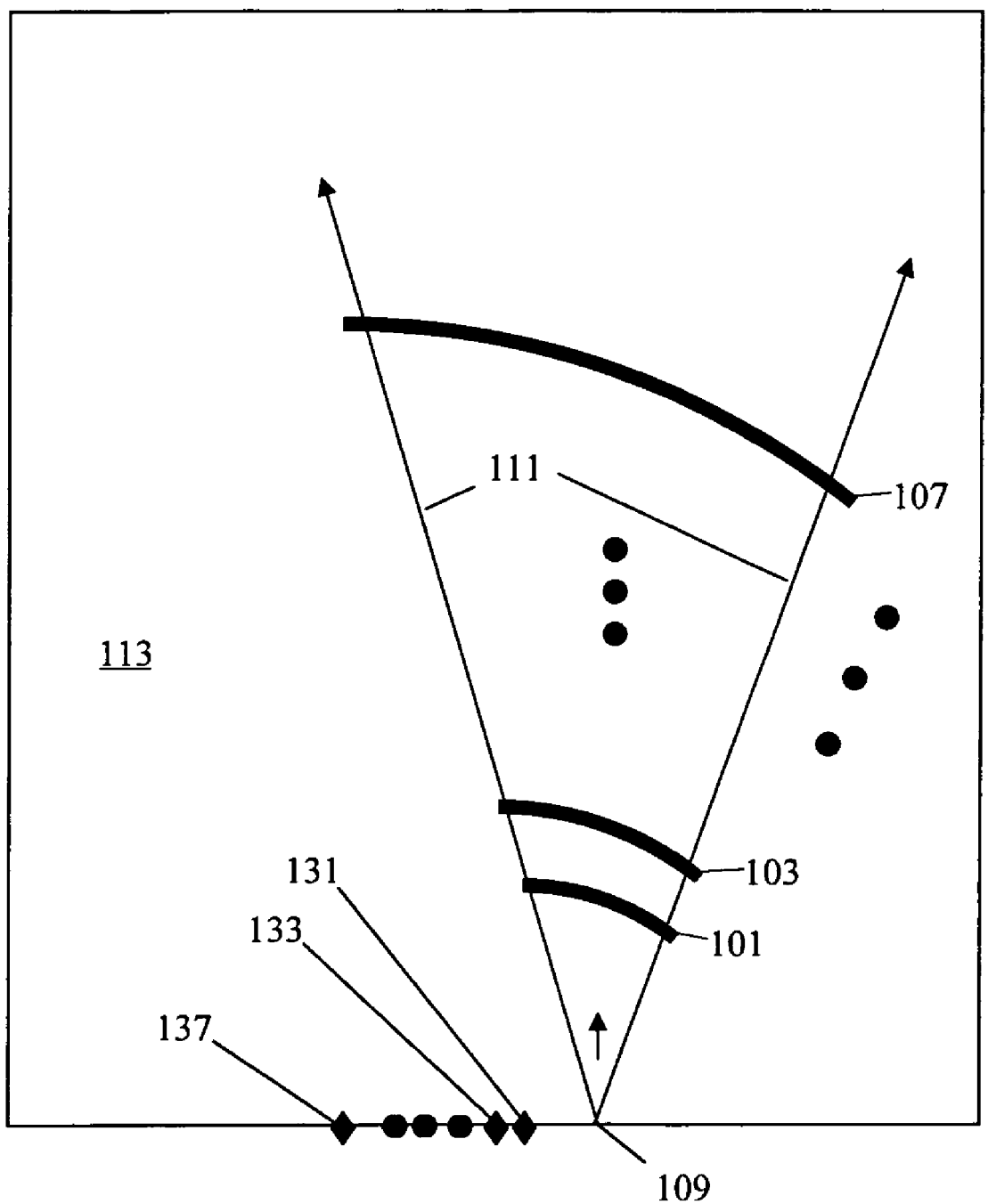
FIGS. 1A-1C are schematic plan views of exemplary slab optical waveguides having diffractive element sets.

The embodiments shown in the Figures are exemplary, and should not be construed as limiting the scope of the present disclosure and/or appended claims.

DETAILED DESCRIPTION OF EMBODIMENTS

An integrated optical spectrometer according to the present disclosure comprises an optical element having one or more sets of diffractive elements. The optical element may comprise a planar optical waveguide substantially confining in at least one transverse spatial dimension optical signals propagating therein, or may enable propagation of optical signals in three spatial dimensions therein.

A planar optical waveguide is generally formed on or from a substantially planar substrate of some sort. The confined optical signals typically propagate as transverse optical modes supported or guided by the planar waveguide. These optical modes are particular solutions of the electromagnetic field equations in the space occupied by the waveguide. The planar waveguide may comprise a slab waveguide (substantially confining in one transverse dimension an optical signal propagating in two dimensions therein), or may comprise a channel waveguide (substantially confining in two transverse dimension an optical signal propagating in one dimension therein). It should be noted that the term "planar waveguide" is not used consistently in the literature; for the purposes of the present disclosure and/or appended claims, the term "planar waveguide" is intended to encompass both slab and channel waveguides.

The planar waveguide typically comprises a core surrounded by lower-index cladding (often referred to as upper and lower cladding, or first and second cladding; these may or may not comprise the same materials). The core is fabricated using one or more dielectric materials substantially transparent over a desired operating wavelength range. In some instances one or both claddings may be vacuum, air, or other ambient atmosphere. More typically, one or both claddings comprise layers of dielectric material(s), with the cladding refractive indices $n_1$ and $n_2$ typically being smaller than the core refractive index $n_{core}$. (In some instances in which short optical paths are employed and some degree of optical loss can be tolerated, the cladding indices might be larger than the core index while still enabling the planar waveguide to support guided, albeit lossy, optical modes.) A planar waveguide may support one or more transverse modes, depending on the dimensions and refractive indices of the core and cladding. A wide range of material types may be employed for fabricating a planar waveguide, including but not limited to glasses, polymers, plastics, semiconductors, combinations thereof, and/or functional equivalents thereof. The planar waveguide may be secured to a substrate for facilitating manufacture, for mechanical support, and/or for other reasons. A planar waveguide typically supports or guides one or more optical modes characterized by their respective amplitude variations along the confined dimension.

The set of diffractive elements of the planar optical waveguide may also be referred to as: a set of holographic elements; a volume hologram; a distributed reflective element, distributed reflector, or distributed Bragg reflector (DBR); a Bragg reflective grating (BRG); a holographic Bragg reflector (HBR); a holographic optical processor (HOP); a programmed holographic structure (PHS); a directional photonic-bandgap structure; a mode-selective photonic crystal; or other equivalent terms of art. Each diffractive element of the set may comprise one or more diffracting regions thereof that diffract, reflect, scatter, route, or otherwise redirect portions of an incident optical signal (said process hereinafter simply referred to as diffraction). For a planar waveguide, the diffracting regions of each diffractive element of the set typically comprises some suitable alteration of the planar waveguide (ridge, groove, index modulation, density modulation, and so on), and is spatially defined with respect to a virtual one- or two-dimensional linear or curvilinear diffractive element contour, the curvilinear shape of the contour typically being configured to impart desired spatial characteristics onto the diffracted portion of the optical signal. For an optical element enabling propagation in three dimensions, the virtual diffractive element contour may be an areal contour. Implementation of a diffractive element with respect to its virtual contour may be achieved in a variety of ways, including those disclosed in the references cited hereinabove. Each areal, linear, or curvilinear diffractive element is shaped to direct its diffracted portion of the optical signal to an output optical port, which may be in or out of a plane defined by the diffractive elements. The relative spatial arrangement (e.g. longitudinal spacing) of the diffractive elements of the set, and the relative amplitude diffracted from each diffractive element of the set, yield desired spectral and/or temporal characteristics for the overall diffracted optical signal routed between the corresponding input and output optical ports. It should be noted that optical ports (input and/or output) may be defined structurally (for example, by an aperture, waveguide, fiber, lens, or other optical component) and/or functionally (for example, by a spatial location, convergence/divergence/collimation, and/or propagation direction). For a single-mode planar waveguide, such a set of diffractive elements may be arranged to yield an arbitrary spectral/temporal transfer function (in terms of amplitude and phase). In a multimode planar waveguide, modal dispersion and mode-to-mode coupling of diffracted portions of the optical signal may limit the range of spectral/temporal transfer functions that may be implemented.

The diffractive elements of the set (or equivalently, their corresponding contours) are spatially arranged with respect to one another so that the corresponding portions of the optical signal diffracted by each element interfere with one another at the output optical port, so as to impart desired spectral and/or temporal characteristics onto the portion of the optical signal collectively diffracted from the set of diffractive elements and routed between the input and output optical ports. The diffractive elements in the set are arranged so that an input optical signal, entering the planar waveguide through an input optical port, is successively incident on diffractive elements of the set. For the purposes of the present disclosure and/or appended claims, "successively incident" shall denote a situation wherein a wavevector at a given point on the wavefront of an optical signal (i.e., a wavefront-normal vector; sometimes referred to as a "portion" of the spatial wavefront) traces a path (i.e., a "ray path") through the diffractive element set that successively intersects the virtual contours of diffractive elements of the set. Such wavevectors at different points on the wavefront may intersect a given diffractive element virtual contour at the same time or at differing times; in either case the optical signal is considered "successively incident" on the diffractive elements. A fraction of the incident amplitude is diffracted by a diffractive element and the remainder transmitted and incident on another diffractive element, and so on successively through the set of diffractive elements. The diffractive elements may therefore be regarded as spaced substantially longitudinally along the propagation direction of the incident optical signal, and a given spatial portion of the wavefront of such a successively incident optical signal therefore interacts with many diffractive elements of the set. (In contrast, the diffractive elements of a thin diffraction grating, e.g. the grating lines of a surface grating, may be regarded as spaced substantially transversely across the wavefront of a normally incident optical signal, and a given spatial portion of the wavefront of such a signal therefore interacts with only one or at most a few adjacent diffractive elements).

As described in detail in U.S. non-provisional application Ser. No. 10/998,185 (cited and incorporated by reference hereinabove), diffracting regions of a diffractive element set may be distributed over one of more spatial regions of the optical element, for facilitating placement of multiple diffractive element sets in a single optical element. These spatial regions may be positioned and arranged so as to impart desired spatial, spectral, or temporal characteristics onto the corresponding routed portions of an incident optical signal. Such arrangement may include an optical signal being successively incident on multiple spatial regions of a diffractive element set, with "successively incident" defined as set forth hereinabove. The word "primitive" may be used to designate one diffractive element set among multiple diffractive element sets in a single optical element (e.g., a single optical device may include multiple "primitive programmed holographic structures").

The set of diffractive elements provides dual functionality, spatially routing an optical signal between an input optical port and an output optical port, while at the same time acting to impart a spectral/temporal transfer function onto the diffracted portion of an input optical signal to yield an output optical signal. The diffractive elements may be designed (by computer generation, for example) so as to provide optimal routing, imaging, or focusing of the optical signal between an input optical port and a desired output optical port, thus reducing or minimizing insertion loss. Simple areal, linear, or curvilinear diffractive elements (segments of circles, spheres, ellipses, ellipsoids, parabolas, paraboloids, hyperbolas, hyperboloids, and so forth), if not optimal, may be employed as approximations of fully optimized contours. A wide range of fabrication techniques may be employed for forming the diffractive element set, and any suitable technique(s) may be employed while remaining within the scope of the present disclosure and/or appended claims. Particular attention is called to design and fabrication techniques disclosed in the references cited and incorporated by reference hereinabove. The following are exemplary only, and are not intended to be exhaustive.

Diffractive elements may be formed lithographically on the surface of a planar optical waveguide, or at one or both interfaces between core and cladding of a planar optical waveguide. Diffractive elements may be formed lithographically in the interior of the core layer and/or a cladding layer of the planar optical waveguide using one or more spatial lithography steps performed after an initial partial deposition of layer material. Diffractive elements may be formed in the core and/or cladding layers by projecting ultraviolet light or other suitable radiation through an amplitude and/or phase mask so as to create an interference pattern within the planar waveguide (fabricated at least in part with suitably sensitive material) whose fringe contours match the desired diffractive element contours. Alteration of the refractive index by exposure to ultraviolet or other radiation results in index-modulated diffractive elements. The mask may be zeroth-order-suppressed according to methods known in the art, including the arts associated with fabrication of fiber Bragg gratings. The amplitude and/or phase mask may be produced lithographically via laser writer or e-beam, it may be interferometrically formed, or it may be formed by any other suitable technique. In instances where resolution is insufficient to produce a mask having required feature sizes, a larger scale mask may be produced and reduced to needed dimensions via photoreduction lithography, as in a stepper, to produce a mask at the needed scale. Diffractive elements may be formed by molding, stamping, impressing, embossing, or other mechanical processes. A phase mask may be stamped onto the core or cladding surface followed by optical exposure to create diffractive elements throughout the core and or cladding region. The optical or UV source used to write the diffractive elements in this case should have a coherence length comparable or longer than the distance from the stamped phase mask to the bottom of the core region. Stamping of the phase mask directly on the device may simplify alignment of diffractive elements with ports or other device components especially when those components may be formed in the same or another stamping process. Many approaches to the creation of refractive index modulations or gratings are known in the art and may be employed in the fabrication of diffractive element sets.

Irradiation-produced refractive index modulations or variations for forming diffractive elements will optimally fall in a range between about $10^{-4}$ and about $10^{-1}$; however, refractive index modulations or variations outside this range may be employed as well. Refractive index modulations or variations may be introduced by light of any wavelength (including ultraviolet light) that produces the desired refractive index changes, provided only that the photosensitive material employed is suitably stable in the presence of light in the desired operating wavelength range of the spectral filter. Exposure of a complete set of diffractive elements to substantially spatially uniform, refractive-index-changing light may be employed to tune the operative wavelength range of the diffractive element set. Exposure of the diffractive element set to spatially non-uniform refractive-index changing light may be employed to chirp or otherwise wavelength-modulate the spectral filter (described further hereinbelow). The sensitivity of planar waveguide materials to irradiation produced refractive index modulations may be increased using hydrogen-loading, flame-brushing, boron or other chemical doping, or other method known in the art, for example in the context of making fiber Bragg gratings.

The curvilinear shape of the diffractive element contours may be determined by a variety of standard optical imaging system design tools. Essentially, each diffractive element contour may be optimized to image the input port onto the output port in a phase coherent manner. In some instances, interference among signals diffracted by multiple diffractive elements may contribute to image formation; this may be the case particularly when the diffracted signals propagate out of a plane defined by the diffractive elements. Inputs to the design are the detailed structure of the input and output optical ports and their locations. Standard ray tracing approaches to optical element design may provide a diffractive contour at each optical distance into the planar waveguide that will provide an optimal imaging of the input signal at the input port onto the optimal output signal at the output port. Simple curves may be employed as approximations of the fully optimized contours. Diffractive element virtual contours may be spaced by an optical path difference (as described above) that provides for the field image of successive diffractive contours to be substantially in phase at a desired wavelength. If the overall response of the diffractive element set is to be apodized with amplitude and/or phase modulation (to yield a desired spectral transfer function or impulse response function), the optical spacing of successive diffractive element contours may be controlled to provide required phase differences between diffracted components at the output port, and/or the diffractive strength of the elements may be individually controlled as well (as described in detail in the references cited hereinabove; also described for certain cases in: T. W. Mossberg, "Planar holographic optical processing devices", *Optics Letters* v26 p414 (2001), said publication being hereby incorporated by reference as if fully set forth herein).

An alternative approach to designing the diffractive element contours for a diffractive element set is to calculate interference patterns between simulated fields at a desired wavelength and with desired waveforms entering the input port and exiting the output port. In forming or writing a summed pattern for the diffractive element set, suitable discretization is applied as needed for any lithographic or UV exposure approach that is utilized for fabrication. The holographic structure may be designed by interference of computer-generated beams having the desired computer-generated temporal waveforms, with the resulting calculated arrangement of diffractive elements implemented by lithography and/or other suitable spatially-selective fabrication techniques. For example, interference between a delta-function-like pulse and a desired reference optical waveform (or its time-reverse) may be calculated, and the resulting interference pattern used to fabricate a diffractive element set that acts to either recognize or generate the desired reference optical waveform.

In an alternative method for making the diffractive element structure, the optical element may include material of appropriate index that is also photosensitive at the wavelength of the desired operational signal beams. As in traditional holography, the input and output recording beams (same wavelength as operational signal beams of the envisioned device) are overlapped in the optical element and the interference pattern between them is recorded. Subsequently the photosensitive material is developed and, if necessary, a cladding may be deposited or attached by other means.

As mentioned in above-cited U.S. Pat. Nos. 6,879,441 and 6,859,318 and U.S. application Ser. No. 11/076,251, inter alia, a single optical apparatus may have multiple primitive sets of diffractive elements. These primitive diffractive element sets may occupy spatial regions in an optical element that are the same, are partially overlapping, or are substantially non-overlapping. More specifically, multiple primitive diffractive element sets may be: i) "stacked" (i.e., positioned one after another along an optical propagation direction from an input port of the optical element); ii) "interleaved" (i.e., the optical element has spatial regions containing diffracting regions of one primitive diffractive element set but no diffracting regions of another primitive diffractive element set; the various spatial regions containing the diffracting regions of a primitive diffractive element set may not be contiguous, but are coherent; the spatial regions may border on other spatial regions containing diffracting regions of other primitive diffractive element sets); iii) overlaid (i.e., the diffracting regions of multiple primitive diffractive element sets occupy a common spatial region); or iv) combined in a common optical element using a combination of these methods. It may be desirable to combine multiple primitive diffractive element sets to create an optical apparatus with multiple outputs and/or inputs, to more efficiently utilize device area, or to meet specific design requirements.

Overlaid primitive diffractive element sets are described in above-cited U.S. Pat. Nos. 6,678,429, 6,829,417, and 6,965,716 and U.S. application Ser. No. 11/280,876. If the fill-factors of diffracting regions of the diffractive elements are sufficiently low (upon implementation of partial-fill grayscale or other apodization technique, for example, as described in the preceding references), then multiple primitive diffractive element sets may be formed in a common spatial region of an optical element with a low probability that diffracting regions of different primitive diffractive element sets would spatially overlap. Such overlap that would occur may be inconsequential, or may be eliminated to any desired degree by element-by-element movement of individual diffracting regions, if desired. At higher fill-factors, a more deterministic approach may be employed for ensuring that diffracting regions for the respective diffractive element sets do not spatially coincide. Depending on the fabrication technique, such considerations may not be necessary. For fabrication by binary lithography, two diffracting regions cannot overlap and function properly. A particular location of the optical element is either etched or not; an optical signal interacts at that location in the same way whether the location was etched to form a single diffracting region or multiple diffracting regions. Fabrication techniques wherein a material response is substantially linear, such as forming diffracting regions by photo-exposure or grayscale lithography, enable formation of diffracting regions that may spatially overlap while each properly fulfills its function. As long as the material response (to the fabrication technique) is substantially linear, a particular location of the optical element will interact differently with an optical signal according to whether it was exposed to form one diffracting regions, two diffracting regions, and so on. For such linear (i.e., grayscale) fabrication techniques, diffractive element sets may be overlaid without regard for fill factor.

Interleaving of multiple primitive diffractive element sets refers to individual primitive diffractive element sets that occupy inter-mixed but substantially non-overlapping spatial regions of an optical element, and is described extensively in above-cited U.S. patent application Ser. No. 10/998,185. Interleaving may be used along with or without other variations of implementing diffracting regions of the diffractive elements (including partial-fill, width-based, line-density, facet-displacement, and element-displacement grayscale methods, other apodization techniques, and so forth). Multiple spatial regions for each of the primitive diffractive element sets may be thought of as forming a "patchwork" over the optical element. Stacking of primitive diffractive element sets might be regarded as the simplest example of interleaving (for which the descriptor "interleaving" may not necessarily even be appropriate), with each primitive diffractive element set occupying a single distinct spatial region of the optical element, and with the spatial regions arranged sequentially along a propagation direction of optical signals (i.e., "stacked"). An incident optical signal is successively incident on each spatial region, and therefore also on each primitive diffractive element set.

True interleaving (i.e., not stacking) may enable improved spectral resolution compared to an optical device of the same overall length with stacked primitive diffractive element sets. It should be noted that in the low to moderate reflection strength case, the spectral resolution $\Delta f_{res}$ (the spectral width of the main reflection maximum) of an unapodized primitive diffractive element set is inversely proportional to the maximal optical path length difference between interfering light beams diffracted by the various diffractive elements of the primitive set. If N primitive programmed holographic structures are stacked and occupy substantially equal portions of a total device length L, the resolution of each primitive diffractive element set is limited by the length L/N. If, on the other hand, N primitive diffractive element sets are each divided into multiple spatial regions, and the spatial regions interleaved so that regions of each primitive set are distributed along the entire length L of the optical element, then the resolution of each primitive diffractive element set would be limited by L. Spatial regions of each primitive diffractive element set may or may not extend across the entire transverse extent of the interleaved multiple diffractive element sets. It is assumed that the various spatial regions of the primitive diffractive element sets are coherent except for phase shifts introduced as part of an overall apodization.

Various adaptation are disclosed and/or claimed in above-cited U.S. application Ser. No. 10/998,185 for reducing, minimizing, or substantially eliminating unwanted spatial or spectral characteristics from routed portions of an incident optical signal that may arise due to interleaving of multiple primitive diffractive element sets. These may be achieved by positioning and arranging the spatial regions occupied the primitive diffractive element sets or by control over the refractive index of the optical element as a function of position.

In the following discussion, the depth direction (i.e., propagation direction of an incident optical signal) refers to the direction normal to the phase front of the input beam, while the transverse direction refers to the direction along the phase front of the input beam (perpendicular to the input beam propagation direction). Note that these direction are defined locally for each portion of the spatial wavefront, which is generally curved.

Figure 1B:
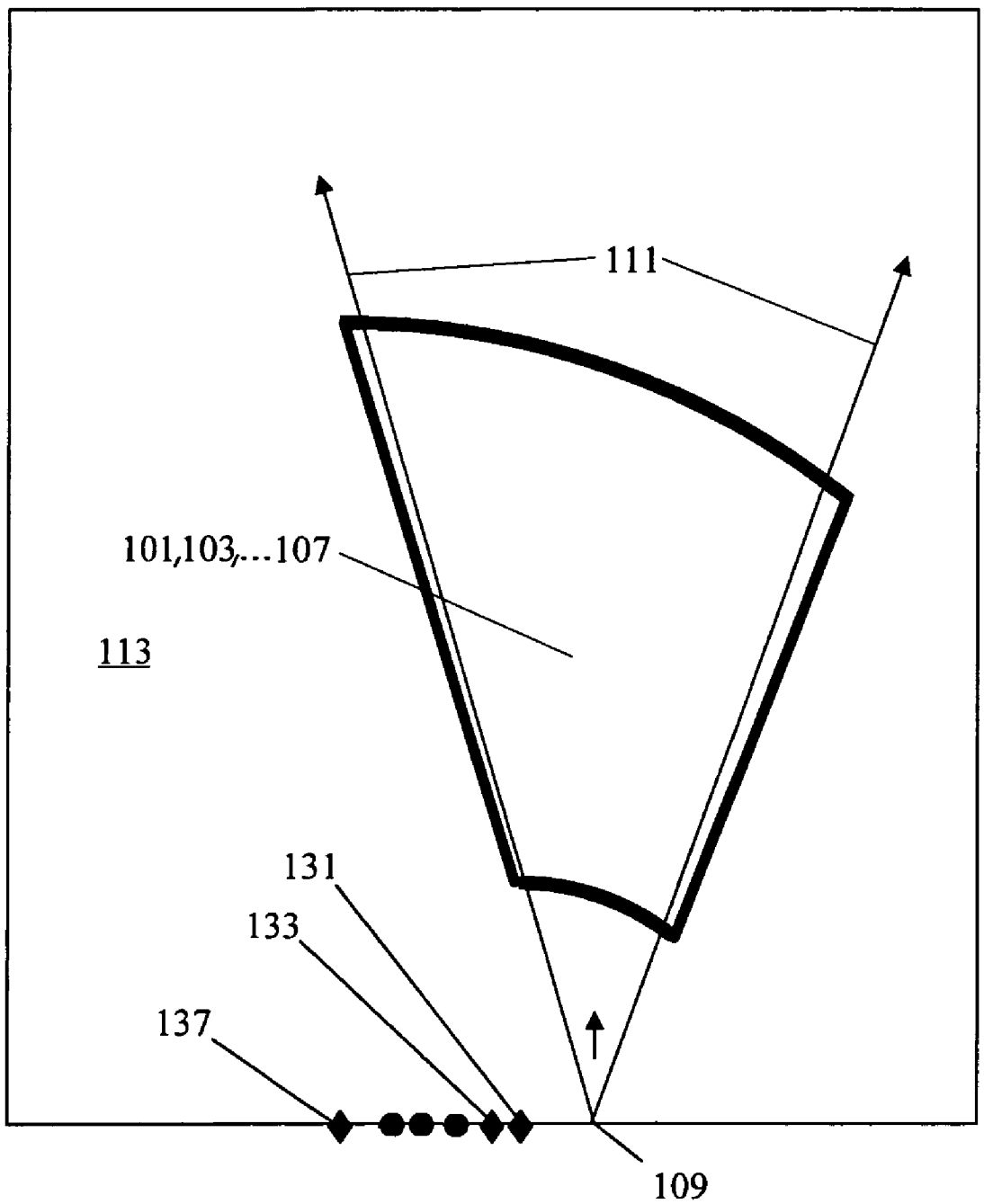
Figure 1C:
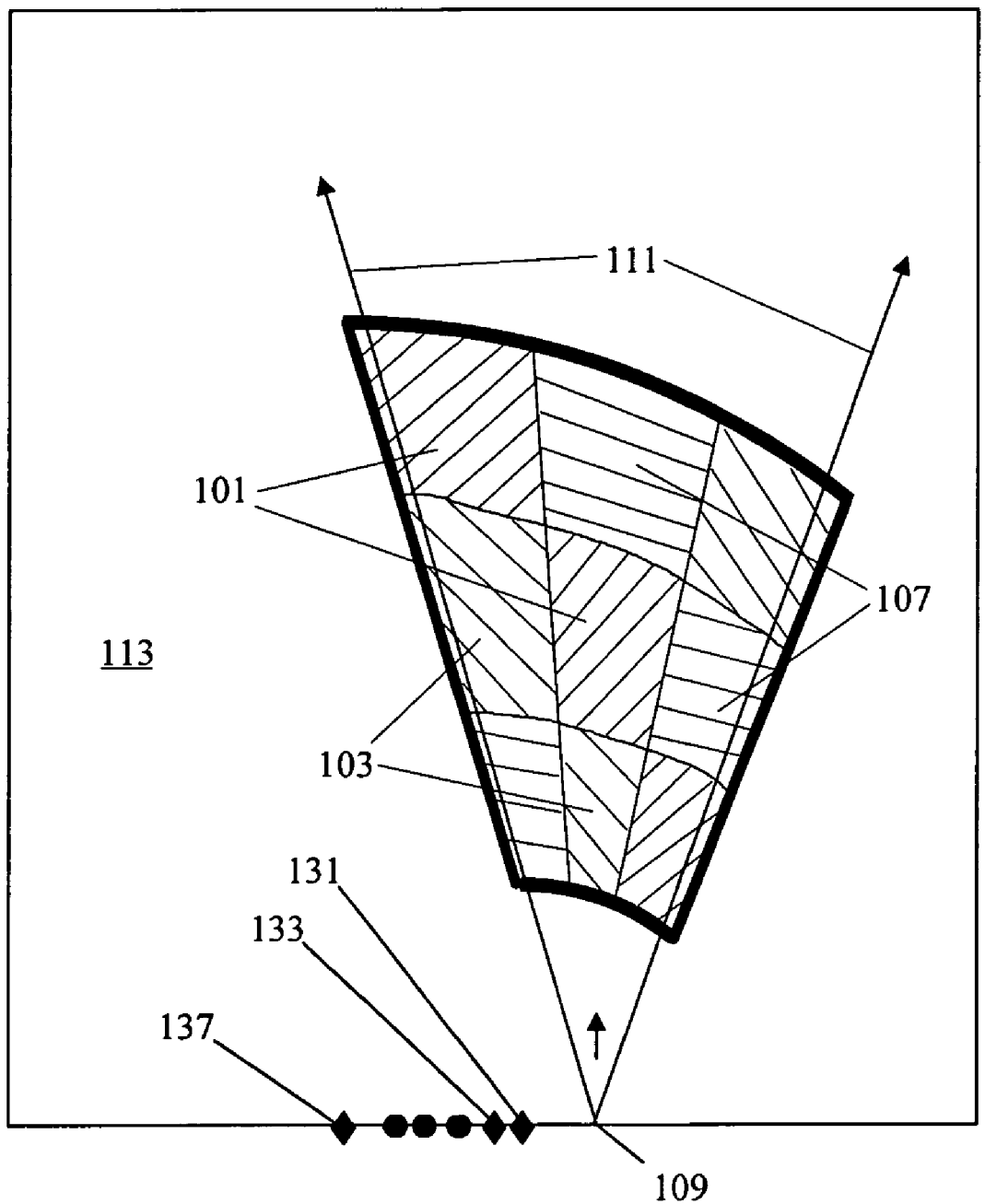

FIGS. 1A-1C illustrate schematically slab waveguides with multiple sets of diffractive elements suitable for use in an exemplary integrated spectrometer. Multiple diffractive element sets 101, 103, . . . 107 (equivalently, primitive holographic structures) are shown formed in slab waveguide 113. An input optical signal enters slab waveguide 113 at input optical port 109. Input optical port 109 may be defined structurally or functionally (as described hereinabove), and the input optical signal may be transmitted into the slab waveguide by any suitable means, including but not limited to a channel waveguide, an optical fiber, a surface mounted prism, a surface coupling grating, free-space propagation through an edge of the slab waveguide, and so forth. The input optical signal propagates in the slab waveguide from input optical port 109 within divergence angle 111 and is incident on the diffractive element sets. Generally, the diffractive elements of each set are contoured so as to provide a desired spatial wavefront transformation that routes a portion of the input optical signal to a corresponding output optical port as a corresponding output optical signal. For discussion purposes only, the diffractive elements of each set 101, 103, . . . 107 in the examples of FIGS. 1A-1C are assumed to comprise a set of concentric circular contours. The corresponding centers of curvature of sets 101, 103, . . . 107 are 131, 133, . . . 137, respectively. It is not necessary that the relative spatial ordering of the centers of curvature follow the spatial ordering of the diffractive element sets, but such ordering may be convenient.

In the exemplary embodiments of FIG. 1A, multiple diffractive element sets are shown "stacked", that is, positioned sequentially along the propagation direction of the input optical signal. As disclosed in various of the above-cited applications and patents, stacking is not the only way in which multiple diffractive element sets may be arranged in a single optical element. Multiple diffractive element sets may be arranged in an integrated optical spectrometer by stacking (as in FIG. 1A), overlaying (as in FIG. 1B), interleaving (as in FIG. 1C), or combinations thereof. Overlaid diffractive element sets are described hereinabove and in above-cited U.S. Pat. Nos. 6,678,429, 6,829,417, and 6,965,716 and U.S. application Ser. No. 11/280,876. Interleaved diffractive element sets are described hereinabove and in above-cited application Ser. No. 10/998,185.

Figure 2A:
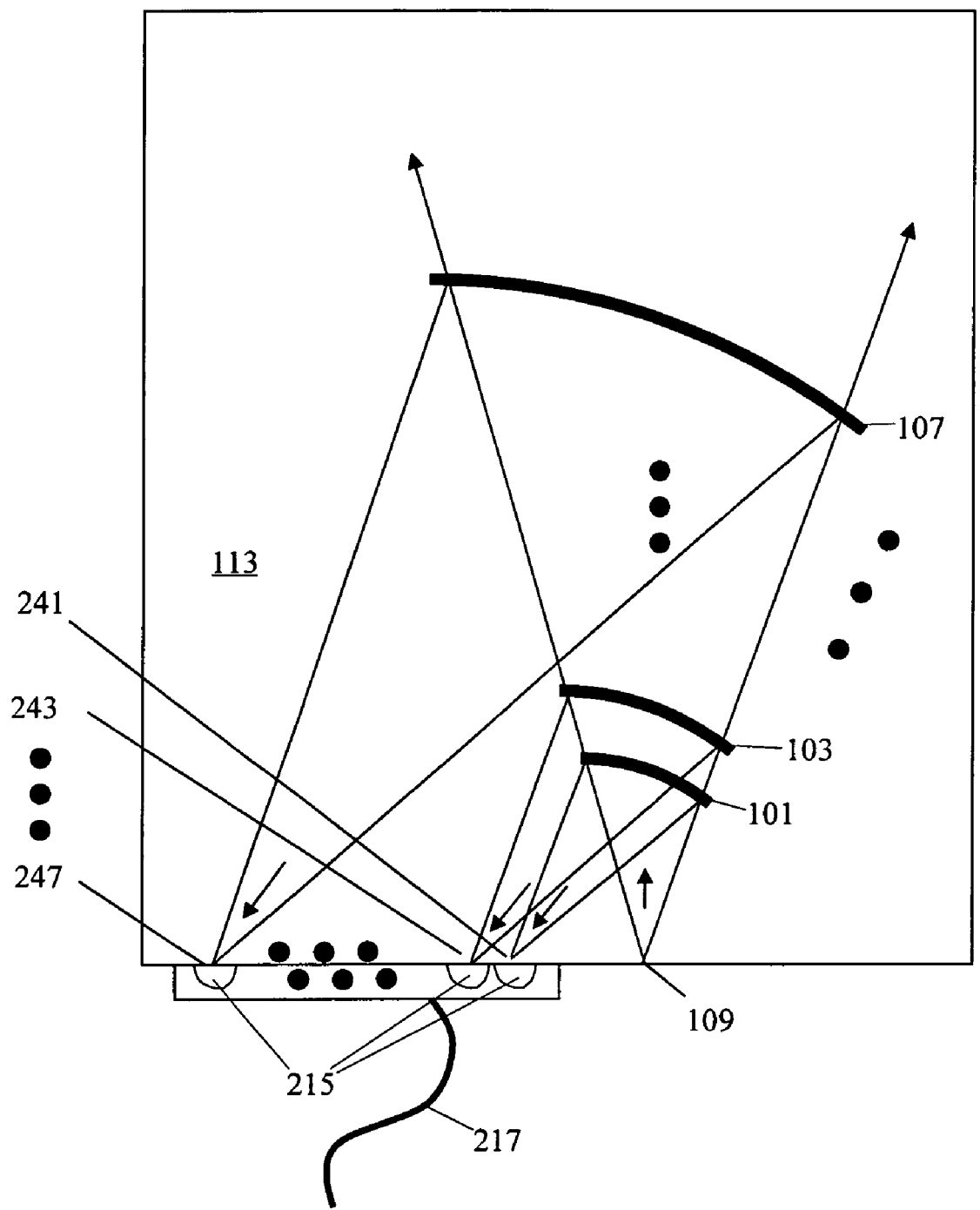
FIGS. 2A-2C are schematic plan views of exemplary integrated optical spectrometers incorporating diffractive element sets.
Figure 2B:
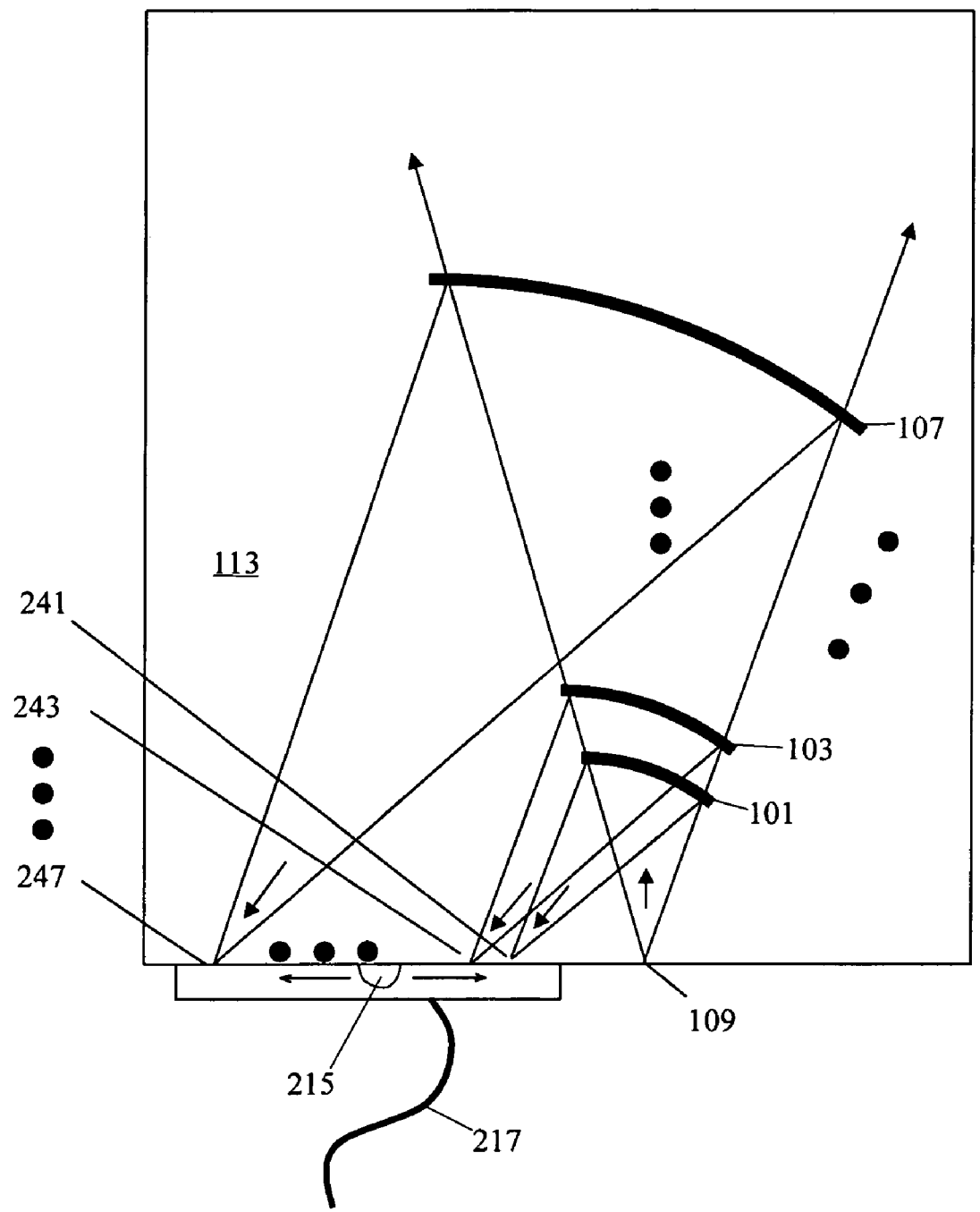
Figure 2C:
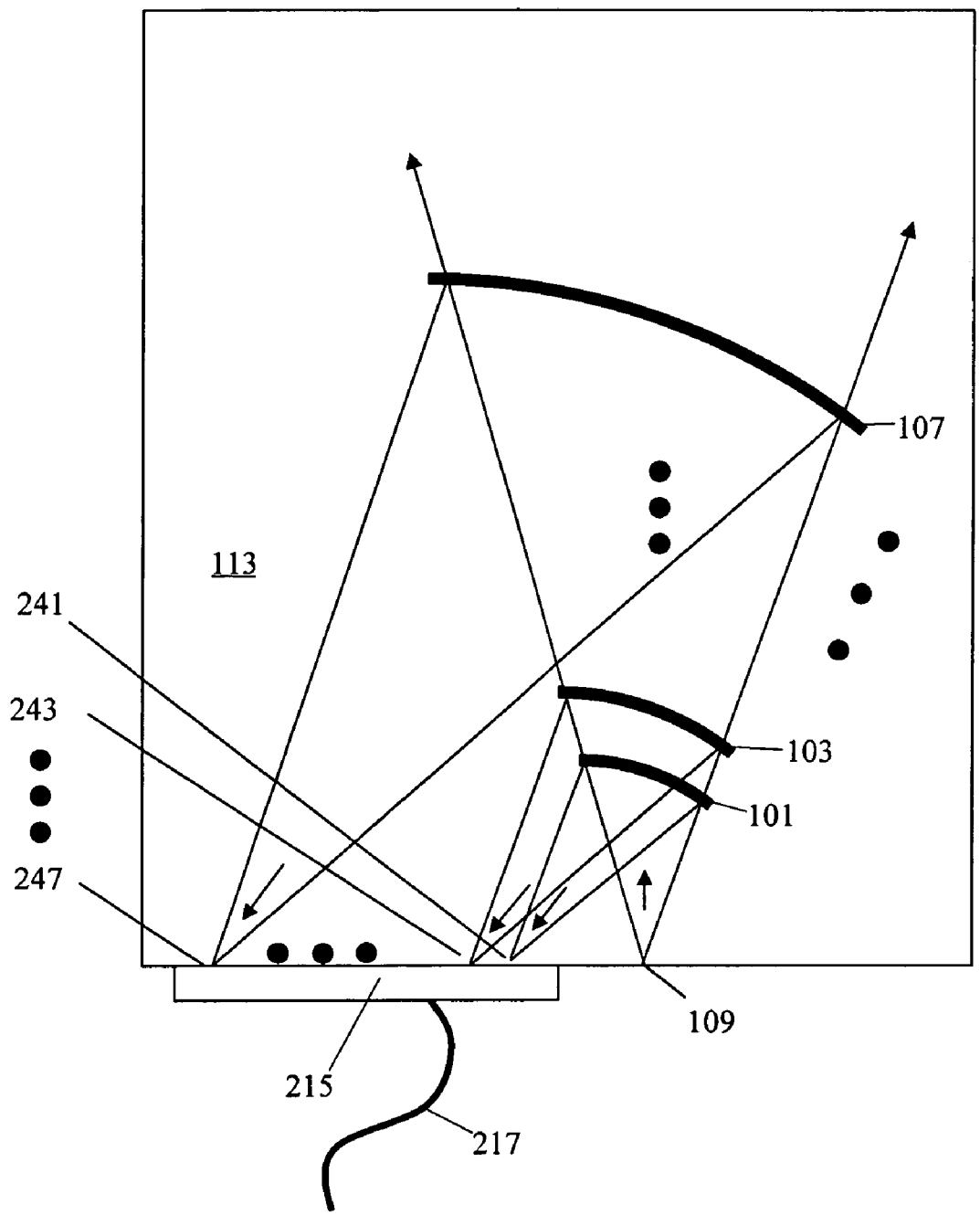

In FIGS. 2A-2C, the exemplary slab waveguide 113 of FIG. 1A is incorporated into an exemplary integrated spectrometer, which comprises the slab waveguide 113 and a photodetector 215. A slab waveguide resembling the examples of FIG. 1B or 1C could be employed as well. Each diffractive element set 101, 103, . . . 107 exhibits spectral and spatial transformation information, and at least two sets differ from one another with respect to their corresponding spectral and spatial transformation information. It may be the case that each diffractive element set differs from all the others with respect to spectral or spatial transformation information. Each diffractive element set 101, 103, . . . 107 routes at least a corresponding portion of the input optical signal to a corresponding output optical port 241, 243, . . . 247 according to the corresponding spatial transformation information as a corresponding output optical signal according to the corresponding spectral transformation information. The output optical ports may be defined structurally or functionally, and the output optical signals may be transmitted from the slab waveguide by any suitable means, including but not limited to a channel waveguide, an optical fiber, a surface mounted prism, a surface coupling grating, free-space propagation through an edge of the slab waveguide, and so forth. In the examples of FIGS. 2A-2C, the circular diffractive elements of each set provide imaging between the input optical port 109 and the corresponding output optical ports 241, 243, . . . 247. As with the ordering of the centers of curvature, the spatial ordering of the corresponding output optical ports 241, 243, . . . 247 need not follow the spatial ordering of the diffractive element sets 101, 103, . . . 107, but such ordering may be convenient. In the examples of FIGS. 2A-2C photodetector 215 is shown positioned at a edge of the slab waveguide 113 for receiving the output optical signals from the output optical ports.

Photodetector 215 may comprise a photodetector array (FIG. 2A), with multiple elements of the photodetector array each receiving the output optical signal routed by one or more of the diffractive element sets. Such a photodetector array may comprise multiple individual photodetectors, or an array wherein the multiple photodetectors are integrated into a unitary array. Instead of multiple photodetectors, a single photodetector may be employed and moved among multiple positions for receiving a corresponding output optical signal at each of the output optical ports (FIG. 2B). Any suitable mechanism may be employed for moving the photodetector among the multiple positions, including but not limited to one or more servo motors, stepper motors, linear translation stages, rotation stages, or other suitable mechanisms. Instead of a photodetector array, photodetector 215 may instead comprise an imaging photodetector positioned for receiving multiple output optical signals from the corresponding output optical ports (FIG. 2C). "Bright spots" in the acquired image would correspond to output optical signals received from the corresponding output optical ports, and may be analyzed in any suitable way for extracting spectral properties of the input signal. Any suitable imaging detector may be employed, including but not limited to a charge-coupled device (CCD), a CMOS sensor, or other imaging detector.

In an example of an integrated spectrometer, the spectral transformation information for each diffractive element set may comprise one primary spectral passband (with or without secondary spectral peaks), each output optical port transmitting one or more of the spectral passbands. It may be the case that each output optical port transmits a spectral passband different from all the others. The spectral passbands may be arranged across an operating spectral range of the spectrometer in any suitable manner. For example, the spectral passbands may be substantially uniformly spaced across the operating spectral range, or the spectral passbands may be centered at corresponding selected targeting wavelengths. This latter scenario may be useful, for example, when the spectrometer is employed for detecting or quantifying one or more specific substances with known spectral characteristics. It may be desirable in some circumstances to arrange the diffractive element sets and the corresponding output optical ports so that the output ports are arranged in a single row and a center wavelength of the corresponding spectral passbands varies monotonically along the row of output ports. In this way the optical output of the integrated spectrometer may functionally resemble the output of a traditional angularly dispersive spectrometer. Whatever the arrangements of the output optical ports, the corresponding spatial transformation information, and the corresponding spectral transformation information, electrical signals generated by photodetector 215 may be output via connection 217 for display, processing, or other analysis of the resulting spectral measurement. One of more of the output optical signals may be used for signal normalization or correction in any suitable way.

Figure 3:
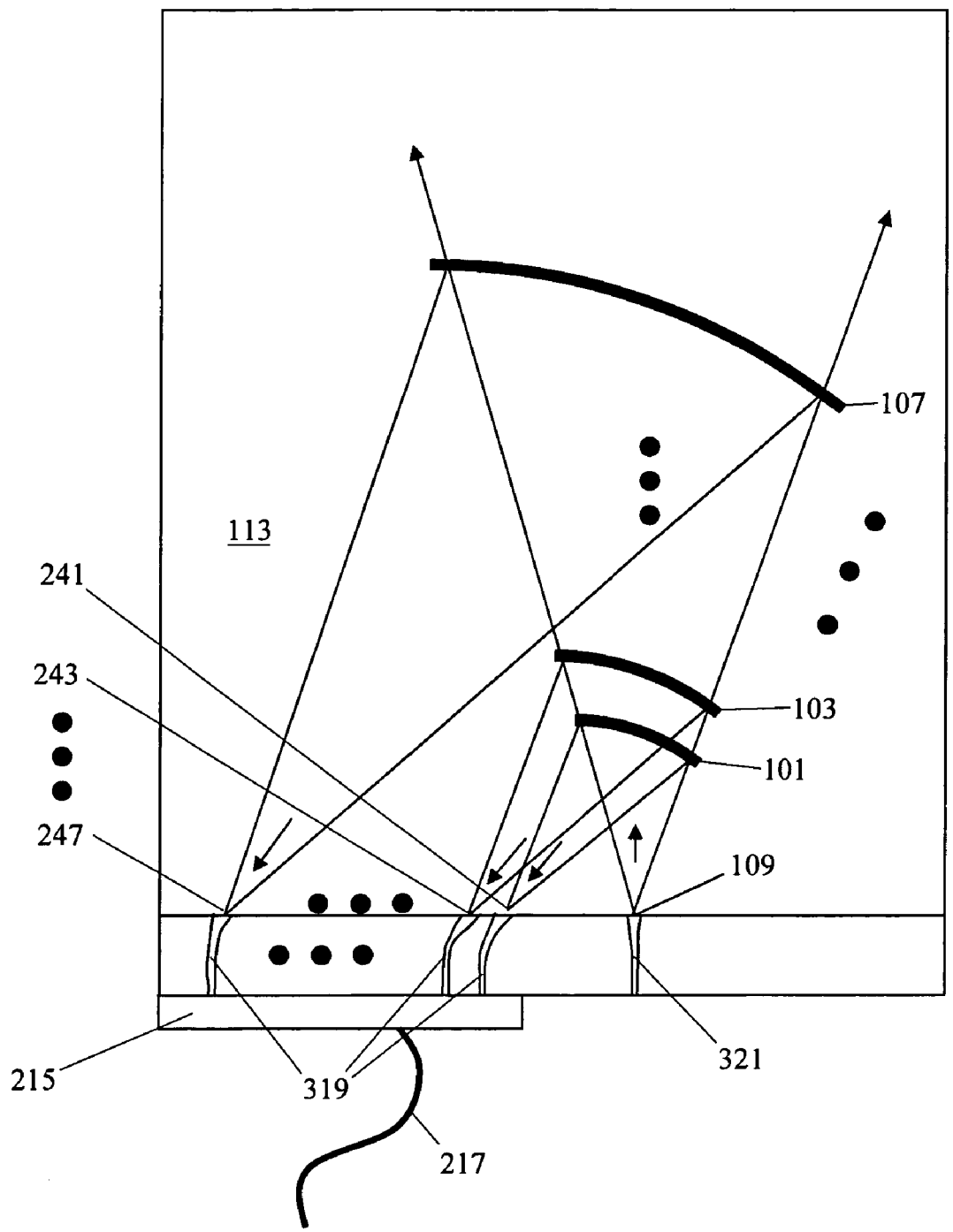
FIG. 3 is a schematic plan view of an exemplary integrated optical spectrometer incorporating diffractive element sets and channel waveguides.

Optical signals may be transmitted to or from the optical ports in any suitable way. The following are exemplary; other arrangements may also fall within the scope of the present disclosure or appended claims. A source of the input signal may be located at the optical input port, or the photodetector(s) may be located at the output optical ports. Input or output optical signals may propagate to or from the respective ports by free-space optical propagation. An input channel waveguide 321 may receive the input optical signal and transmit it into the spectrometer at the input optical port 109, or multiple output channel waveguides 319 may receive the output optical signals at the output ports 241, 243, . . . 247 and transmit them to the photodetector(s) 215 (FIG. 3).

The channel waveguides may comprise optical fiber, channel waveguides integrally formed with the optical spectrometer (particularly a slab-waveguide-based spectrometer), or combinations thereof. A slab-waveguide-based integrated spectrometer may be adapted for receiving the input optical signal in only a single transverse optical mode, or in multiple transverse optical modes (in transverse directions parallel or perpendicular to the confinement dimension of the slab waveguide). On the input side, a single-mode spectrometer may enable higher spectral resolution, while a multi-mode spectrometer may enable higher optical signal throughput, relaxed alignment tolerances, or relaxed fabrication tolerances. On the output side (i.e. the detection side), the photodetector(s) may typically integrate detected signals over a large solid angle and a large surface area, rendering less significant the differences between single-mode and multi-mode spectrometers.

A slab-waveguide-based integrated spectrometer arranged for receiving a multi-mode input optical signal may enable more efficient collection of an input optical signal from an incoherent optical source, or from a source not necessarily spatial mode-matched to the slab waveguide or input optical port. Such a source may comprise, inter alia, a reflective source, a fluorescent source, a phosphorescent source, a scattering source, a stimulated emission source, a laser source, or other optical signal source. Such sources may comprise one or more solids, liquids, gases, solutions, suspensions, or mixtures thereof. The particular configuration of a multi-mode spectrometer will typically entail a compromise between collection or throughput efficiency versus spectral resolution. Above-cited U.S. application Ser. No. 10/842,790 describes the design, characterization, and performance of diffractive element sets in multi-mode planar waveguides.

Figure 4:
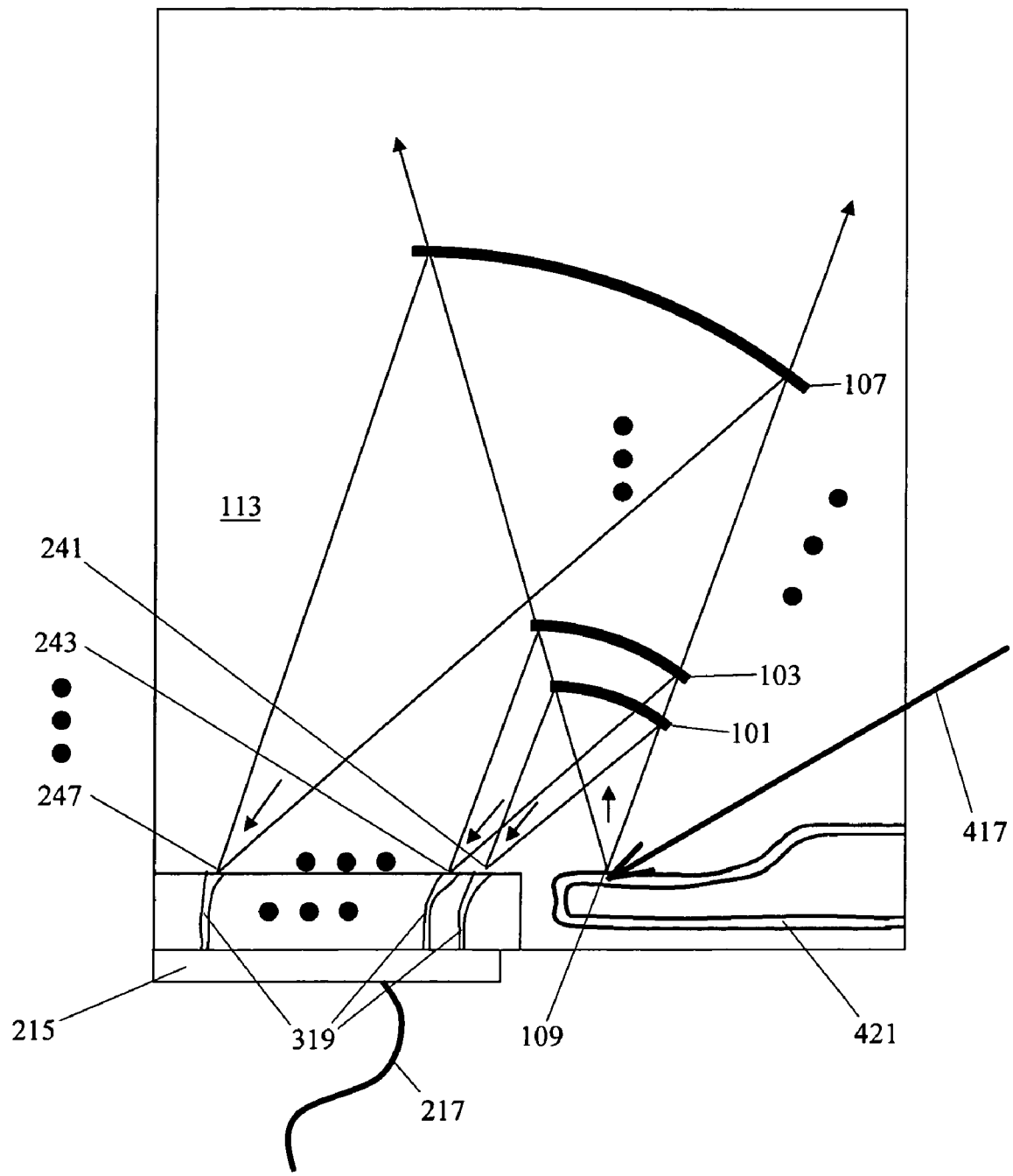
FIG. 4 is a schematic plan view of an exemplary integrated optical spectrometer incorporating diffractive element sets and a sample chamber.

An integrated spectrometer may further comprise a sample chamber. At least a portion of the sample chamber is positioned at the input optical port so that at least a portion light emitted from the sample chamber is transmitted as the input optical signal into the spectrometer through the input optical port. In the exemplary embodiment of FIG. 4, the sample chamber comprises a fluid channel 421 through a portion of the slab waveguide 113; other fluid chamber arrangements may be employed. A portion of the fluid channel is positioned at input optical port 109 (a functional optical port in this embodiment defined by the diffractive element sets) and a portion of any light emanating from a fluid sample at this portion of the fluid channel is the input optical signal. In this example an optical excitation source illuminates the portion of the fluid channel 421 positioned at the input optical port 109. A portion of the resulting emission or scattering is the input optical signal. The illuminating light 417 may propagate to the illuminated portion of the sample chamber substantially confined by the slab waveguide 113 (i.e. substantially parallel to the slab waveguide, via edge-coupling, optical fiber, channel waveguide, or other suitable means), or outside the slab waveguide (i.e. in a direction with a substantial component parallel to the confined dimension of the slab waveguide, via free-space propagation, prism coupling, grating coupling, or other suitable means). Any suitable excitation source may be employed. If desired, the integrated spectrometer slab waveguide with the fluid channel may be made a disposable item, and may be further configured to engage with a mechanism for providing necessary fluid connections, for introducing the illuminating light, and/or for providing the photodetector(s) 215.

Figure 5A:
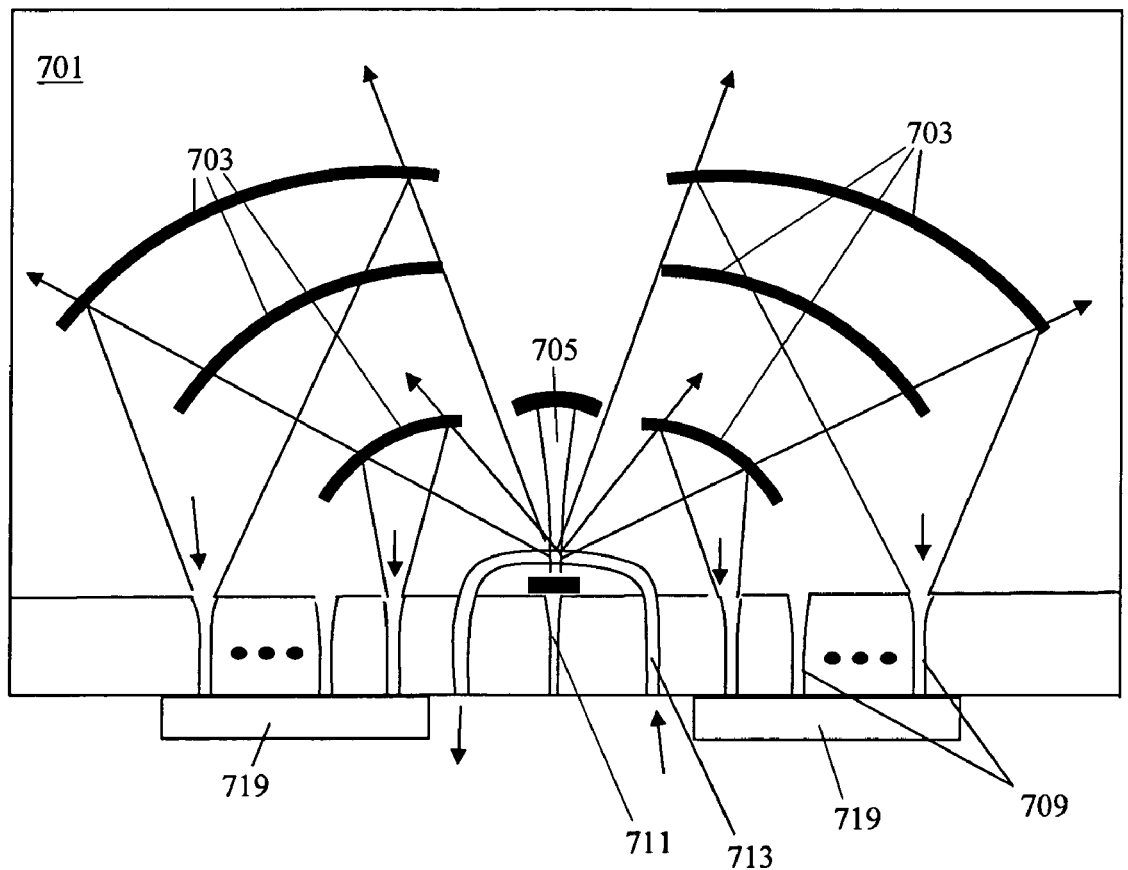
FIGS. 5A and 5B are schematic plan views of exemplary integrated optical spectrometers incorporating diffractive element sets and an optical resonator.

In some instances, optical excitation of a sample sufficiently intense to produce a detectable optical signal may require additional adaptations of an integrated spectrometer. In the exemplary embodiment of FIG. 5A, additional diffractive element sets define an optical resonator 705 within slab waveguide 701 (examples of such resonators are disclosed in above-cited application Ser. No. 11/213,345). While a simple two-mirror standing-wave resonator is shown here, any suitable standing- or traveling-wave resonator may be employed. A portion of sample chamber 713 (a fluid channel in this example) is positioned in the slab waveguide with the portion of the sample chamber located at the input optical port also being located within the modal volume defined by the optical resonator 705. In this example the input optical port is functionally defined by the sample chamber, resonator modal volume, and diffractive element sets 703. Illuminating light enters the slab waveguide and the resonator 705 via waveguide 711, and if resonant experiences a power build-up in the resonator. This intra-cavity power build-up increases the excitation intensity at the sample, resulting in a larger input optical signal for the integrated spectrometer. Diffractive element sets 703 direct their respective output optical signals to output waveguides 709 and photodetectors 719.

Spatial and spectral mode-matching the incident excitation light with mode(s) supported by the resonator will enhance optical power build-up in the cavity, which is typically desirable. For example, input waveguide 711 and diffractive element sets 705 may be arranged for spatial mode matching of the illuminating light to the resonator spatial modes. A transducer or actuator may be employed for altering the resonance frequencies of the resonator to match or lock onto the frequency of the excitation light. Any suitable transducer or actuator may be employed for altering the resonator resonance wavelength, including but not limited to: thermo-optic, electro-optic, nonlinear optical, photoelastic, and so forth. Some of the techniques and adaptations disclosed in above-cited U.S. Pat. No. 6,965,464 and application Ser. No. 11/239,540, or any other suitable control or feedback mechanism(s) may be employed for altering the resonance frequency of the resonator.

Figure 5B:
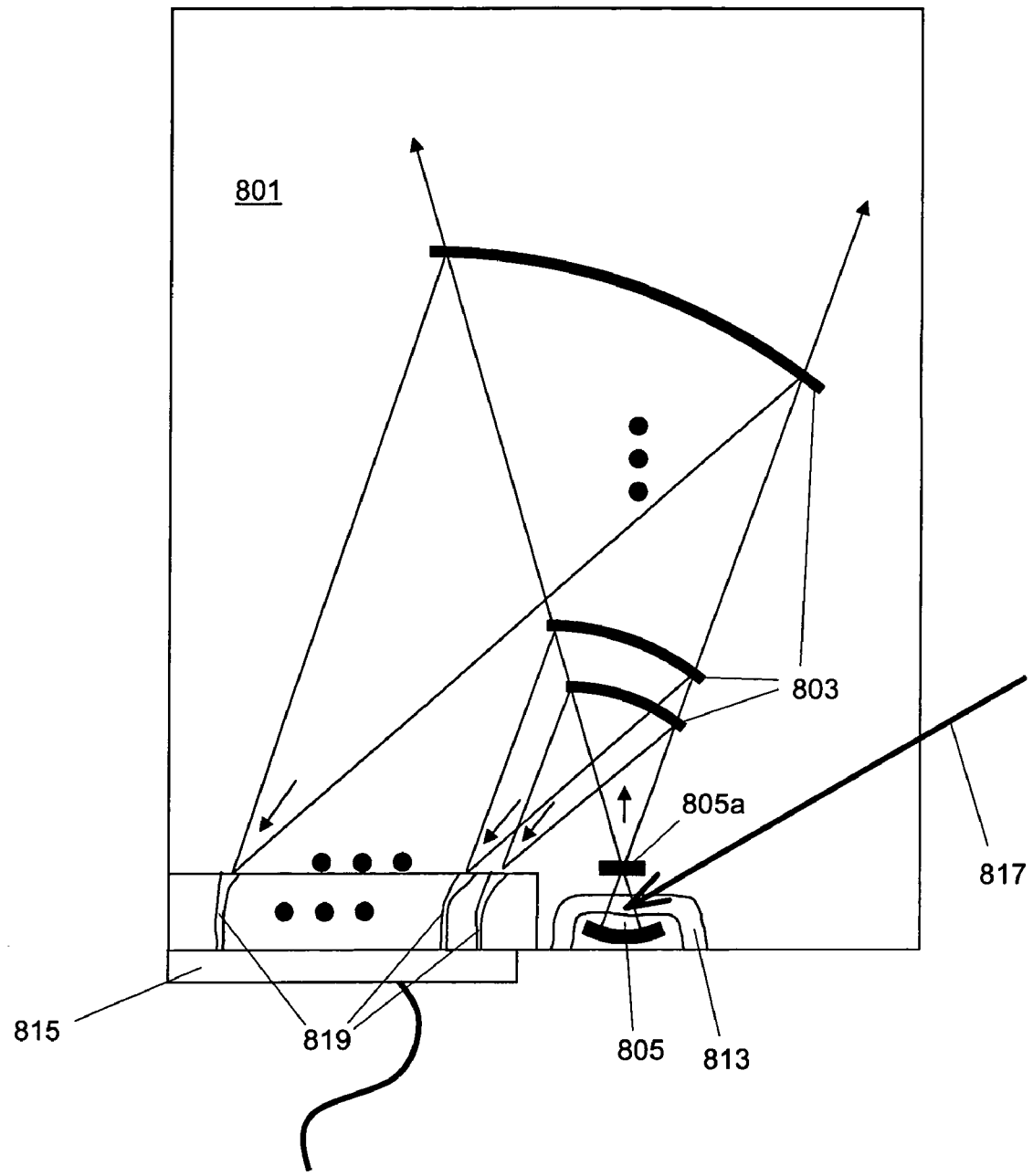

In some instances, it may be possible or desirable to use an optical resonator to enhance the intensity of light emitted from the sample that enters the integrated spectrometer through the input optical port. In the exemplary embodiment of FIG. 5B, additional diffractive element sets define an optical resonator 805 within slab waveguide While a simple two-mirror standing-wave cavity is shown here, any suitable standing- or traveling-wave resonator may be employed. A portion of sample chamber 813 (a fluid channel in this example) that is illuminated by illuminating light 817 is positioned in the slab waveguide within the modal volume defined by the optical resonator 805. The diffractive elements defining the resonator 805 are arranged so that resonator 805 supports resonant wavelengths at least partly overlapping the emission spectrum of the sample. Light emitted by the sample excites one or more optical modes of the resonator 805, thereby enhancing emission by the sample into those modes. One diffractive element set 805a defining resonator 805 is partially transmitting, and emitted, resonant light transmitted through set 805a forms the input optical signal. The resonator 805 is arranged so that one or more of its supported spatial modes, when transmitted through set 805a, define the input optical port. The illuminating light 817 may propagate to the illuminated portion of the sample chamber 813 substantially confined by the slab waveguide 801 or outside the slab waveguide 801. Any suitable excitation source may be employed. Resonant emission supported by resonator 805 is transmitted through diffractive elements 805a and the input optical port to diffractive element sets 803. Diffractive element sets 803 in turn direct their respective output optical signals to output waveguides 819 and photodetectors 815. Enhancement of the intensity of resonant emitted optical signals may be on the order of the finesse of the resonator 805 at the emitted wavelengths.

Figure 6:
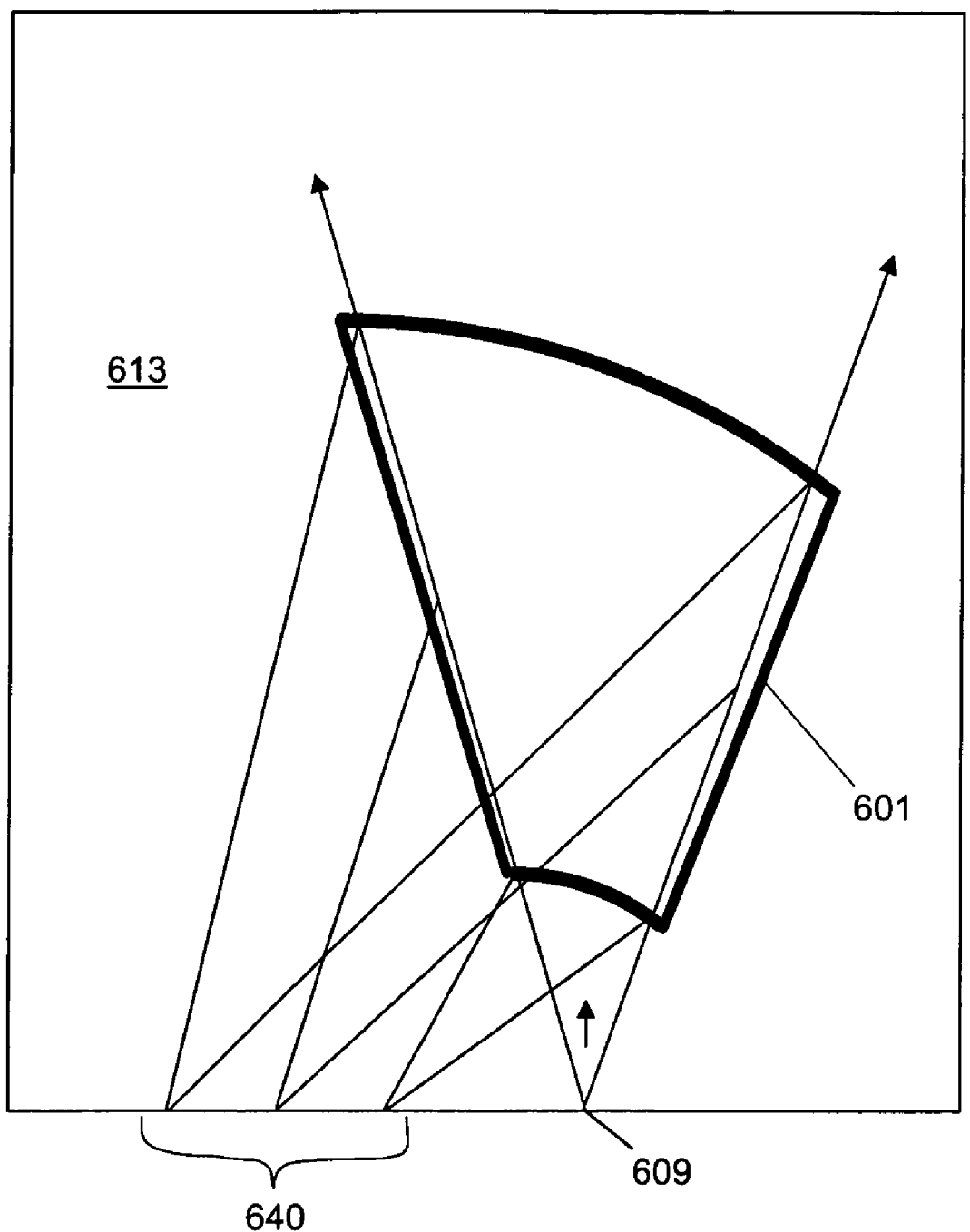
FIG. 6 is a schematic plan view of an exemplary slab optical waveguide having a diffractive element set.

The exemplary embodiments discussed thus far have each comprised an optical element (such as a slab waveguide) having multiple sets of diffractive elements, each one producing a corresponding output optical signal according to corresponding spatial and spectral transformation information and directed to a corresponding output optical port. For example, in FIG. 1 each diffractive element set comprises a set of concentric circular contours, with the center of curvature shifted for each set. Alternatively, a gradual, quasi-continuous shift of the center of curvature of each diffractive element, or of small discrete subsets of diffractive elements, could be employed. Similarly, a gradual, quasi-continuous shift of spectral properties of the diffractive element sets or localized subsets thereof may be employed. In this way the multiple diffractive element sets would tend to behave as a single diffractive element set 601 wherein the spectral and spatial transformation information varies with position in the set, or among localized subsets of diffractive elements, so that an optical spectrum of the output optical signal varies with spatial position at an optical output region 640 of the optical element 613 (FIG. 6). The optical output signal in this case may resemble the output of a more traditional angularly-dispersive spectrometer, for example, and would not correspond to discrete output ports. Instead of circular contours with varying radii and centers of curvature, an integrated spectrometer may comprise diffractive elements contoured in a more general way to achieve desired spatial transformations, with the generalized contours evolving in a quasi-continuous manner with position within the diffractive element set or among localized subsets thereof. With such a quasi-continuous set of diffractive elements, a set of multiple photodetectors may be employed to spatially (and therefore also spectrally) sample the output optical signal, or a single photodetector may be scanned across the output region to acquire the output optical signal, or an imaging photodetector may acquire the output optical signal. The designed spatial variation of the output optical spectrum with position at the output optical region (arising from the variation of spectral and spatial transformation information in the diffractive element set) enables analysis or processing of the optical spectrum of the output signal.

Figure 7:
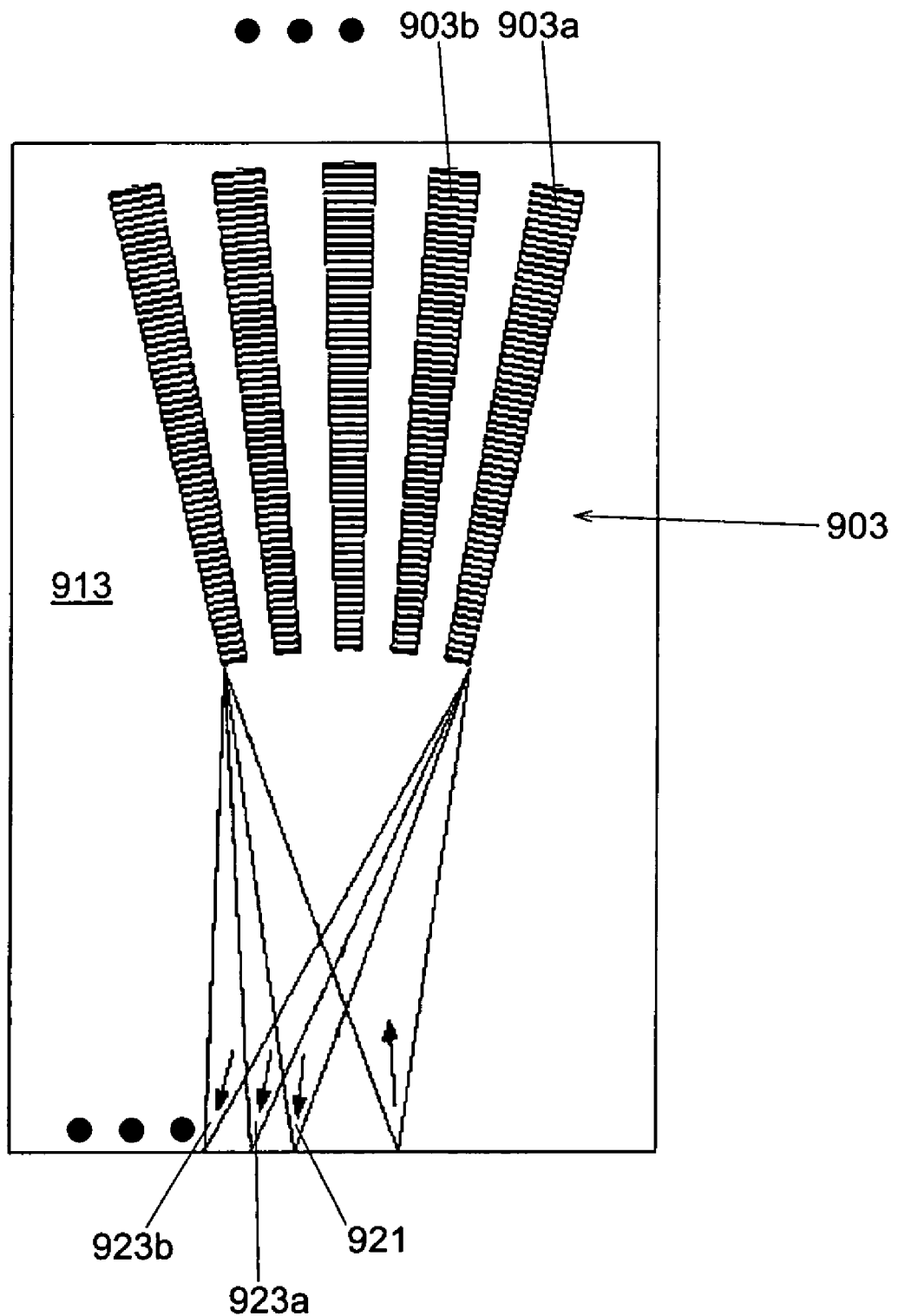
FIG. 7 is a schematic plan view of an exemplary slab optical waveguide having a diffractive element set.

In another exemplary embodiment of an integrated spectrometer with one or more diffractive element sets, illustrated schematically in FIG. 7, partial-fill grayscale (as described in above-cited U.S. Pat. Nos. 6,678,429, 6,829,417, and 6,965,716, and in U.S. application Ser. No. 11/280,876) is employed for forming a set of diffractive elements 903 in a slab waveguide 913. Each diffractive element is formed as a plurality of diffracting regions substantially uniformly spaced along the length of the diffractive element, and the diffracting regions are aligned as shown in FIG. 7 to form longitudinal "slices" (903a, 903b, and so on) through the diffractive element set 903. The transverse spacing of the diffracting regions gives rise to multiple diffracted orders of the diffractive element set, angularly dispersed in a manner analogous to the behavior of a traditional surface diffraction grating. It should be noted that the transverse spacing of the diffracting regions is exaggerated in FIG. 7 for clarity, and that the number of slices shown (5) is therefore unrealistically small; the transverse spacing in an actual device would be much smaller (on the order of the operating wavelength), with many more slices making up the diffractive element set. The zero-order diffracted optical signal 921 has no angular spectral dispersion, while higher order diffracted signals 923a, 923b, and so on exhibit angular spectral dispersion. One or more of these non-zero-order dispersed diffracted optical signals may be used as the output optical signal of the spectrometer, with a photodetector receiving the dispersed output optical signal. As described above, the photodetector may comprise a photodetector array, one or more movable photodetectors, or an imaging photodetector. The amplitude and phase arising from each diffractive element may be apodized as described in various of the above-cited references for achieving a desired overall spectral transfer function for the integrated optical spectrometer, or for preferentially suppressing the zero-order diffracted signal. For example, if every other longitudinal slice 903a, 903b, and so on were longitudinally displaced by $\lambda/4$ (in-medium), then the amplitude of the zero-order diffracted signal would be substantially suppressed. Other adaptations disclosed in the above-cited references may be employed as well.

Figure 8A:
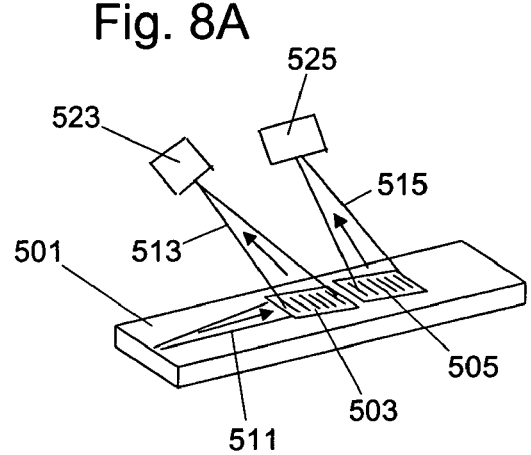
FIGS. 8A-8C are schematic perspective views of exemplary slab optical waveguides having diffractive element sets.
Figure 8C:
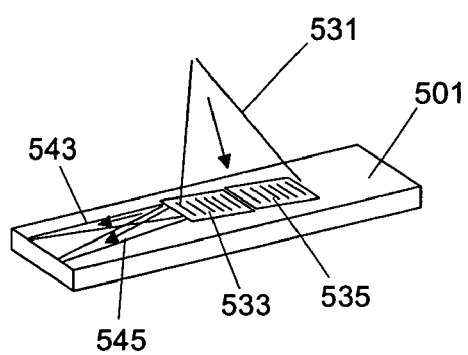
Figure 8B:
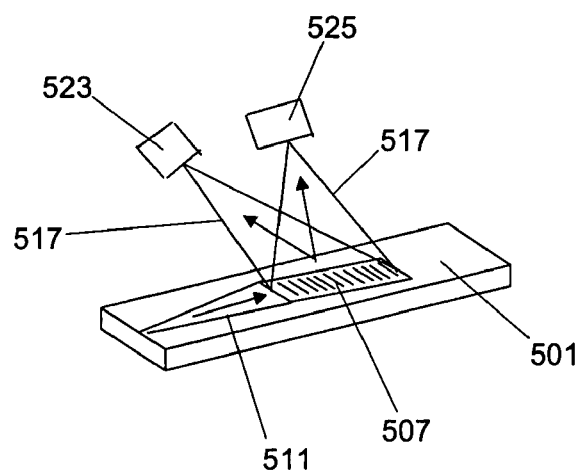

In other exemplary embodiments of integrated spectrometers with one or more diffractive element sets, illustrated schematically in FIGS. 8A-8C, diffractive coupling of in-plane and out-of-plane optical signals is employed. "In-plane" refers to optical signals substantially confined by the slab waveguide, while "out-of-plane" refers to optical signals propagating along a direction with a substantial component parallel to the confined dimension of the slab. In FIG. 8A, an in-plane input optical signal 511 propagates within slab waveguide 501 and is incident on diffractive element sets 503 and 505. The diffractive element sets route corresponding portions of the input optical signal as corresponding out-of-plane output optical signals 513 and 515 to corresponding output optical ports lying outside the slab waveguide 501 in a region of free-space optical propagation. Corresponding photodetectors 523 and 525 receive the output optical signals. Any desired number of diffractive element sets may be used, directing output optical signals to any suitable number of output optical ports or photodetectors. A separate photodetector may be used for each output optical port, one or more photodetectors may be moved among multiple output optical ports, or an imaging photodetector may be used. Each diffractive element set may be arranged for providing a desired spectral passband or other desired spectral transfer function. The arrangement of FIG. 8B is similar to that of FIG. 8A, except that a single diffractive element set 507 is employed that is arranged so as to yield an angularly dispersed output optical signal 517. Such an arrangement is feasible due to out-of-plane propagation of one of the optical signals, for which wavevector matching requirements for diffraction are less restrictive than for in-plane propagation of both optical signals. The embodiment of FIG. 8C may be arranged or adapted in a manner similar to FIG. 8A or 8B, except that an out-of-plane input optical signal 531 is incident on diffractive element sets 533 and 535, yielding corresponding in-plane output optical signals 543 and 545 (corresponding photodetectors not shown). The diffractive elements of any of the embodiments of FIGS. 8A-8C may be formed, for example, as disclosed in above-cited application Ser. Nos. 11/055,559 and 11/062,109.

In the exemplary embodiments of FIGS. 1A, 2A-2C, 3, 4, 5, 8A, and 8C, multiple diffractive element sets are shown "stacked", that is, positioned sequentially along the propagation direction of the input optical signal. As disclosed in various of the above-cited applications and patents, stacking is not the only way in which multiple diffractive element sets may be arranged in a single optical element. Multiple diffractive element sets may be arranged in an integrated optical spectrometer by stacking, overlaying (FIG. 1B), interleaving (FIG. 1C), or combinations thereof. Overlaid diffractive element sets are described hereinabove and in above-cited U.S. Pat. Nos. 6,678,429, 6,829,417, and 6,965,716 and U.S. application Ser. No. 11/280,876. Interleaved diffractive element sets are described hereinabove and in above-cited application Ser. No. 10/998,185.

Various adaptations may be employed for improving the diffraction efficiency or for reducing the optical loss of the diffractive element sets in an integrated spectrometer. Examples of such adaptations are disclosed in above-cited App. Ser. Nos. 10/898,527 and 11/021,549.

It may be desirable to dynamically alter the spatial or spectral transformation information of one or more diffractive element sets of an integrated spectrometer. For example, it may be desirable to spectrally shift the passband received at an output optical port, or it may be desirable to switch a spectral passband from one output port to another. Any suitable transducer or actuator may be employed for altering the spectral or spatial transformation information of one or more of the diffractive element sets, including but not limited to: thermo-optic, electro-optic, nonlinear optical, photo-elastic, and so forth. Some of the techniques and adaptations disclosed in above-cited U.S. Pat. No. 6,965,464 and application Ser. No. 11/239,540, or any other suitable control or feedback mechanism(s) may be employed for altering the resonance frequency of the resonator.

It should be noted that many of the embodiments depicted in this disclosure are only shown schematically, and that not all the features may be shown in full detail or in proper proportion and/or location. Certain features or structures may be exaggerated relative to others for clarity. In particular, it should be noted that individual diffractive elements are not shown; spatial regions having diffracting regions of a particular diffractive element set are shown instead. It should be further noted that the embodiments shown in the Figures are exemplary only, and should not be construed as specifically limiting the scope of the written description or the claims set forth herein. It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: i) it is explicitly stated otherwise, e.g., by use of "either . . . or", "only one of . . . ", or similar language; or ii) two or more of the listed alternatives are mutually exclusive within the particular context, in which case "or" would encompass only those combinations involving non-mutually-exclusive alternatives.

What is claimed is:

1. An optical apparatus, comprising:
an optical element having a set of diffractive elements and a sample chamber; and
at least one photodetector,
wherein:
the diffractive elements of the set are collectively arranged so as to comprise spectral and spatial transformation information;
the diffractive elements of the set are collectively arranged so as to transform a portion of an input optical signal into an output optical signal according to the spectral and spatial transformation information, the input optical signal propagating within the optical element from an input optical port, the output optical signal propagating within the optical element to an optical output region of the optical element;
the spectral and spatial transformation information varies among the diffractive elements of the set so that an optical spectrum of the output optical signal varies with spatial position at the optical output region of the optical element;
at least one photodetector is positioned for receiving at least a portion of the output optical signal from at least a portion of the optical output region; and
at least a portion of the sample chamber is positioned at the input optical port so that at least a portion of light emitted from the sample chamber is transmitted as the input optical signal into the optical element at the input optical port.

2. The optical apparatus of claim 1, wherein the spectral and spatial transformation information varies among subsets of the diffractive elements.

3. The optical apparatus of claim 2, wherein each subset is spatially localized within the diffractive element set.

4. The optical apparatus of claim 2, wherein:
the diffractive elements of each subset are collectively arranged so as to comprise corresponding spectral and spatial transformation information for each subset;
at least two of the diffractive element subsets differ with respect to their corresponding spectral transformation information and with respect to their corresponding spatial transformation information; and
the diffractive elements of each subset are collectively arranged so as to transform a portion of an input optical signal into a corresponding portion of the output optical signal according to the corresponding spectral and spatial transformation information, the corresponding portions of the output optical signal each propagating within the optical element to a corresponding output optical port at the optical output region.

5. The optical apparatus of claim 1, wherein:
each diffractive element is individually contoured and positioned so as to preferentially route a portion of the input optical signal between the input optical port and the optical output region as the optical signals propagate within the optical element; and
the diffractive elements are collectively arranged so as to exhibit a positional variation in amplitude, optical separation, or spatial phase over some portion of the set.

6. The optical apparatus of claim 1, wherein:
each diffractive element diffracts a corresponding diffracted component of the input optical signal with a corresponding diffractive element transfer function between the input optical port and the optical output region;
each diffractive element comprises at least one diffracting region having at least one altered optical property so as to enable diffraction of a portion of the input optical signal; and
the diffracting regions of each diffractive element are arranged so as to collectively provide the corresponding diffractive element transfer function between the input optical port and the optical output region.

7. The optical apparatus of claim 1, wherein the at least one photodetector:
comprises multiple photodetectors, each of the multiple photodetectors being positioned for receiving a corresponding portion of the output optical signal from a corresponding portion of the optical output region;
comprises a photodetector array positioned for receiving the output optical signal from the optical output region;
comprises an imaging photodetector positioned for receiving the output optical signal from the optical output region; or
is arranged to move among multiple positions of the optical output region for receiving a corresponding portion of the output optical signal at each of the multiple positions.

8. The optical apparatus of claim 1, wherein subsets of the diffractive element set are at least partly stacked, at least partly interleaved, or at least partly overlaid.

9. The optical apparatus of claim 1, wherein the optical element comprises a slab waveguide arranged to substantially confine in one transverse dimension optical signals propagating in two dimensions therein.

10. The optical apparatus of claim 9, further comprising:
an input channel waveguide positioned and arranged to (i) receive the input optical signal, (ii) substantially confine the input optical signal in two dimensions as the input optical signal propagates along the input channel waveguide, and (iii) transmit the input optical signal into the slab waveguide at the input optical port; or
multiple output channel waveguides, each positioned and arranged to (i) receive a corresponding portion of the output optical signal from the slab waveguide at the optical output region, (ii) substantially confine the corresponding portion of the output optical signal in two dimensions as the corresponding portion of the output optical signal propagates along the output channel waveguide, and (iii) transmit the corresponding portion of the output optical signal to the photodetector.

11. The optical apparatus of claim 10, wherein the input channel waveguide comprises a channel waveguide integrally formed with the slab waveguide, or each of the multiple output channel waveguides comprises a channel waveguide integrally formed with the slab waveguide.

12. The optical apparatus of claim 10, wherein the input channel waveguide comprises an optical fiber, or each of the multiple output channel waveguides comprises an optical fiber.

13. The optical apparatus of claim 9, wherein the slab waveguide is arranged to receive the input optical signal in a single transverse optical mode.

14. The optical apparatus of claim 9, wherein the slab waveguide is arranged to receive the input optical signal in multiple transverse optical modes.

15. The optical apparatus of claim 1, further comprising an optical excitation source arranged to illuminate the portion of the sample chamber positioned at the optical input port.

16. The optical apparatus of claim 15, wherein:
the optical element comprises a slab waveguide arranged to substantially confine in one transverse dimension optical signals propagating in two dimensions therein; and
the optical element and the optical excitation source are arranged so that illuminating light propagates from the optical excitation source to the sample chamber substantially confined by the slab waveguide.

17. The optical apparatus of claim 15, wherein:
the optical element comprises a slab waveguide arranged to substantially confine in one transverse dimension optical signals propagating in two dimensions therein; and
the optical element and the optical excitation source are arranged so that illuminating light propagates from the optical excitation source to the sample chamber in a direction with a substantial component parallel to the confined transverse dimension of the slab waveguide.

18. The optical apparatus of claim 15, wherein:
the optical element further comprises a set of diffractive elements defining an optical resonator within the optical element, the portion of the sample chamber at the input optical port being positioned within a modal volume of the optical resonator; and
the optical resonator and the optical excitation source are arranged so that illuminating light propagates from the optical excitation source to the optical resonator and excites at least one optical mode of the optical resonator.

19. The optical apparatus of claim 18, further comprising a wavelength shifter arranged to alter a resonance wavelength of the optical resonator in response to a wavelength of the illuminating light.

20. The optical apparatus of claim 15, wherein:
the optical element further comprises a set of diffractive elements defining an optical resonator within the optical element, at least one supported optical mode of the resonator being partially transmitted through a diffractive element set of the resonator and defining the input optical port; and
the optical resonator is arranged so that light emitted by the sample excites at least one optical mode of the optical resonator.

21. The optical apparatus of claim 1, wherein the sample chamber comprises a fluid flow channel formed within the optical element.

22. An optical apparatus, comprising:
an optical element having a set of diffractive elements; and
at least one photodetector,
wherein:
the diffractive elements of the set are collectively arranged so as to comprise spectral and spatial transformation information;
the diffractive elements of the set are collectively arranged so as to transform a portion of an input optical signal into an output optical signal according to the spectral and spatial transformation information, the input optical signal propagating within the optical element from an input optical port, the output optical signal propagating within the optical element to an optical output region of the optical element;
the diffractive elements of the set are collectively arranged so that the spectral and spatial transformation information results in an optical spectrum of the output optical signal that comprises a spectral passband having a center wavelength that varies monotonically with spatial position at the optical output region of the optical element; and
at least one photodetector is positioned for receiving at least a portion of the output optical signal from at least a portion of the optical output region.

23. The optical apparatus of claim 22, wherein the spectral and spatial transformation information varies among subsets of the diffractive elements.

24. The optical apparatus of claim 23, wherein each subset is spatially localized within the diffractive element set.

25. The optical apparatus of claim 23, wherein:
the diffractive elements of each subset are collectively arranged so as to comprise corresponding spectral and spatial transformation information for each subset;
at least two of the diffractive element subsets differ with respect to their corresponding spectral transformation information and with respect to their corresponding spatial transformation information; and
the diffractive elements of each subset are collectively arranged so as to transform a portion of an input optical signal into a corresponding portion of the output optical signal according to the corresponding spectral and spatial transformation information, each corresponding portion of the output optical signal having a corresponding spectral passband with a corresponding center wavelength and propagating within the optical element to a corresponding output optical port at the optical output region.

26. The optical apparatus of claim 25, wherein the multiple corresponding spectral passbands are substantially uniformly spaced across an operating spectral range of the optical apparatus.

27. The optical apparatus of claim 25, wherein the corresponding output optical ports are arranged in a single row so that the center wavelength of each corresponding spectral passband varies monotonically along the row of output optical ports.

28. The optical apparatus of claim 25, wherein the corresponding spectral passbands are centered at corresponding selected target wavelengths within an operating spectral range of the optical apparatus.

29. The optical apparatus of claim 25, wherein each of the corresponding output optical ports is spatially distinct from the others.

30. The optical apparatus of claim 22, wherein:

each diffractive element of each set is individually contoured and positioned so as to preferentially route a portion of the input optical signal between the input optical port and the optical output region as the optical signals propagate within the optical element; and the diffractive elements of each set are collectively arranged so as to exhibit a positional variation in amplitude, optical separation, or spatial phase over some portion of the set.

31. The optical apparatus of claim 22, wherein:

each diffractive element of each set diffracts a corresponding diffracted component of the input optical signal with a corresponding diffractive element transfer function between the input optical port and the optical output region;

each diffractive element comprises at least one diffracting region having at least one altered optical property so as to enable diffraction of a portion of the input optical signal; and the diffracting regions of each diffractive element are arranged so as to collectively provide the corresponding diffractive element transfer function between the input optical port and the optical output region.

32. The optical apparatus of claim 22, wherein the at least one photodetector:

comprises multiple photodetectors, each of the multiple photodetectors being positioned for receiving a corresponding portion of the output optical signal from a corresponding portion of the optical output region;

comprises a photodetector array positioned for receiving the output optical signal from the optical output region;

comprises an imaging photodetector positioned for receiving the output optical signal from the optical output region; or is arranged to move among multiple positions of the optical output region for receiving a corresponding portion of the output optical signal at each of the multiple positions.

33. The optical apparatus of claim 22, wherein the multiple diffractive element sets are at least partly stacked, at least partly interleaved, or at least partly overlaid.

34. The optical apparatus of claim 22, wherein the optical element comprises a slab waveguide arranged to substantially confine in one transverse dimension optical signals propagating in two dimensions therein.

35. The optical apparatus of claim 34, further comprising:

an input channel waveguide positioned and arranged to (i) receive the input optical signal, (ii) substantially confine the input optical signal in two dimensions as the input optical signal propagates along the input channel waveguide, and (iii) transmit the input optical signal into the slab waveguide at the input optical port; or multiple output channel waveguides, each positioned and arranged to (i) receive a corresponding portion of the output optical signal from the slab waveguide at the optical output region, (ii) substantially confine the corresponding portion of the output optical signal in two dimensions as the corresponding portion of the output optical signal propagates along the output channel waveguide, and (iii) transmit the corresponding portion of the output optical signal to the photodetector.

36. The optical apparatus of claim 35, wherein the input channel waveguide comprises a channel waveguide integrally formed with the slab waveguide, or the multiple output channel waveguides each comprise a channel waveguide integrally formed with the slab waveguide.

37. The optical apparatus of claim 35, wherein the input channel waveguide comprises an optical fiber, or the multiple output channel waveguides each comprise an optical fiber.

38. The optical apparatus of claim 34, wherein the slab waveguide is arranged to receive the input optical signal in a single transverse optical mode.

39. The optical apparatus of claim 34, wherein the slab waveguide is arranged to receive the input optical signal in multiple transverse optical modes.

40. A method, comprising:

receiving at an input optical port of an optical element an input optical signal from a sample chamber of the optical element; and detecting at least one output optical signal at a corresponding optical output region of the optical element, wherein:

the optical element includes a set of diffractive elements collectively arranged so as to comprise corresponding spectral and spatial transformation information;

the diffractive elements of the set are collectively arranged so as to transform a portion of the input optical signal into the output optical signal according to the spectral and spatial transformation information, the input optical signal propagating within the optical element from the input optical port, the output optical signal propagating within the optical element to the optical output region of the optical element;

the spectral and spatial transformation information varies among the diffractive elements of the set so that an optical spectrum of the output optical signal varies with spatial position at the optical output region of the optical element;

at least one photodetector is positioned for receiving at least a portion of the output optical signal from at least a portion of the optical output region; and at least a portion of the sample chamber is positioned at the input optical port so that at least a portion of light emitted from the sample chamber is transmitted as the input optical signal into the optical element at the input optical port.

41. The method of claim 40, further comprising illuminating the portion of the sample chamber positioned at the optical input port.

42. The method of claim 41, wherein:

the optical element comprises a slab waveguide arranged to substantially confine in one transverse dimension optical signals propagating in two dimensions therein; and the optical element and an optical excitation source are arranged so that illuminating light propagates from the optical excitation source to the sample chamber substantially confined by the slab waveguide.

43. The method of claim 41, wherein:

the optical element comprises a slab waveguide arranged to substantially confine in one transverse dimension optical signals propagating in two dimensions therein; and the optical element and an optical excitation source are arranged so that illuminating light propagates from the optical excitation source to the sample chamber in a direction with a substantial component parallel to the confined transverse dimension of the slab waveguide.

44. The method of claim 41, wherein:

the optical element further comprises a set of diffractive elements defining an optical resonator within the optical element, the portion of the sample chamber at the input optical port being positioned within a modal volume of the optical resonator; and the optical resonator and the optical excitation source are arranged so that illuminating light propagates from the optical excitation source to the optical resonator and excites at least one optical mode of the optical resonator.

45. The method of claim 44, further comprising altering with a wavelength shifter a resonance wavelength of the optical resonator in response to a wavelength of the illuminating light.

46. The method of claim 41, wherein:

the optical element further comprises a set of diffractive elements defining an optical resonator within the optical element, at least one supported optical mode of the resonator being partially transmitted through a diffractive element set of the resonator and defining the input optical port; and the optical resonator is arranged so that light emitted by the sample excites at least one optical mode of the optical resonator.

47. The method of claim 40, wherein the sample chamber comprises a fluid flow channel formed within the optical element.

48. A method, comprising:

receiving an input optical signal at an input optical port of an optical element;

detecting at least one output optical signal at a corresponding optical output region of the optical element, wherein:

the optical element includes a set of diffractive elements collectively arranged so as to comprise spectral and spatial transformation information;

the diffractive elements of the set are collectively arranged so as to transform a portion of the input optical signal into the output optical signal according to the spectral and spatial transformation information, the input optical signal propagating within the optical element from the input optical port, the output optical signal propagating within the optical element to the optical output region of the optical element;

the diffractive elements of the set are collectively arranged so that the spectral and spatial transformation information results in an optical spectrum of the output optical signal that comprises a spectral passband having a center wavelength that varies monotonically with spatial position at the optical output region of the optical element; and at least one photodetector is positioned for receiving at least a portion of the output optical signal from at least a portion of the optical output region.

49. The method of claim 48, wherein:

the spectral and spatial transformation information varies among subsets of the diffractive elements;

the diffractive elements of each subset are collectively arranged so as to comprise corresponding spectral and spatial transformation information for each subset;

at least two of the diffractive element subsets differ with respect to their corresponding spectral transformation information and with respect to their corresponding spatial transformation information; and the diffractive elements of each subset are collectively arranged so as to transform a portion of an input optical signal into a corresponding portion of the output optical signal according to the corresponding spectral and spatial transformation information, each corresponding portion of the output optical signal having a corresponding spectral passband with a corresponding center wavelength and propagating within the optical element to a corresponding output optical port at the optical output region.

50. The method of claim 49, wherein the multiple corresponding spectral passbands are substantially uniformly spaced across an operating spectral range of the optical apparatus.

51. The optical apparatus of claim 49, wherein the corresponding output optical ports are arranged in a single row so that the center wavelength of each corresponding spectral passband varies monotonically along the row of output optical ports.

52. The optical apparatus of claim 49, wherein the corresponding spectral passbands are centered at corresponding selected target wavelengths within an operating spectral range of the optical apparatus.

53. The optical apparatus of claim 49, wherein each of the corresponding output optical ports is spatially distinct from the others.

54. A method, comprising:

forming an optical element having a set of diffractive elements and a sample chamber; and positioning at least one photodetector for receiving at least a portion of an output optical signal at an optical output region of the optical element, wherein:

the diffractive elements of the set are collectively arranged so as to comprise spectral and spatial transformation information;

the diffractive elements of the set are collectively arranged so as to transform a portion of an input optical signal into an output optical signal according to the spectral and spatial transformation information, the input optical signal propagating within the optical element from an input optical port, the output optical signal propagating within the optical element to an optical output region of the optical element;

the spectral and spatial transformation information varies among the diffractive elements of the set so that an optical spectrum of the output optical signal varies with spatial position at the optical output region of the optical element;

at least one photodetector is positioned for receiving at least a portion of the output optical signal from at least a portion of the optical output region; and at least a portion of the sample chamber is positioned at the input optical port so that at least a portion of light emitted from the sample chamber is transmitted as the input optical signal into the optical element at the input optical port.

55. The method of claim 54, further comprising positioning an optical excitation source to illuminate the portion of the sample chamber positioned at the optical input port.

56. The method of claim 55, wherein:

the optical element comprises a slab waveguide arranged to substantially confine in one transverse dimension optical signals propagating in two dimensions therein; and the optical element and an optical excitation source are arranged so that illuminating light propagates from the optical excitation source to the sample chamber substantially confined by the slab waveguide.

57. The method of claim 55, wherein:

the optical element comprises a slab waveguide arranged to substantially confine in one transverse dimension optical signals propagating in two dimensions therein; and the optical element and an optical excitation source are arranged so that illuminating light propagates from the optical excitation source to the sample chamber in a direction with a substantial component parallel to the confined transverse dimension of the slab waveguide.

58. The method of claim 55, wherein:

the optical element further comprises a set of diffractive elements defining an optical resonator within the optical element, the portion of the sample chamber at the input optical port being positioned within a modal volume of the optical resonator; and the optical resonator and the optical excitation source are arranged so that illuminating light propagates from the optical excitation source to the optical resonator and excites at least one optical mode of the optical resonator.

59. The method of claim 58, further comprising a wavelength shifter arranged to alter a resonance wavelength of the optical resonator in response to a wavelength of the illuminating light.

60. The method of claim 55, wherein:

the optical element further comprises a set of diffractive elements defining an optical resonator within the optical element, at least one supported optical mode of the resonator being partially transmitted through a diffractive element set of the resonator and defining the input optical port; and the optical resonator is arranged so that light emitted by the sample excites at least one optical mode of the optical resonator.

61. The method of claim 54, wherein the sample chamber comprises a fluid flow channel formed within the optical element.

62. A method, comprising:

forming an optical element having a set of diffractive elements; and positioning at least one photodetector for receiving at least a portion of an output optical signal at an optical output region of the optical element, wherein:

the diffractive elements of the set are collectively arranged so as to comprise spectral and spatial transformation information;

the diffractive elements of the set are collectively arranged so as to transform a portion of an input optical signal into an output optical signal according to the spectral and spatial transformation information, the input optical signal propagating within the optical element from an input optical port, the output optical signal propagating within the optical element to an optical output region of the optical element;

the diffractive elements of the set are collectively arranged so that the spectral and spatial transformation information results in an optical spectrum of the output optical signal that comprises a spectral passband having a center wavelength that varies monotonically with spatial position at the optical output region of the optical element; and at least one photodetector is positioned for receiving at least a portion of the output optical signal from at least a portion of the optical output region.

63. The method of claim 62, wherein:

the spectral and spatial transformation information varies among subsets of the diffractive elements;

the diffractive elements of each subset are collectively arranged so as to comprise corresponding spectral and spatial transformation information for each subset;

at least two of the diffractive element subsets differ with respect to their corresponding spectral transformation information and with respect to their corresponding spatial transformation information; and the diffractive elements of each subset are collectively arranged so as to transform a portion of an input optical signal into a corresponding portion of the output optical signal according to the corresponding spectral and spatial transformation information, each corresponding portion of the output optical signal having a corresponding spectral passband with a corresponding center wavelength and propagating within the optical element to a corresponding output optical port at the optical output region.

64. The method of claim 63, wherein the multiple corresponding spectral passbands are substantially uniformly spaced across an operating spectral range of the optical apparatus.

65. The method of claim 63, wherein the corresponding output optical ports are arranged in a single row so that the center wavelength of each corresponding spectral passband varies monotonically along the row of output optical ports.

66. The method of claim 63, wherein the corresponding spectral passbands are centered at corresponding selected target wavelengths within an operating spectral range of the optical apparatus.

67. The method of claim 63, wherein each of the corresponding output optical ports is spatially distinct from the others.

* * * * *